United States Patent
Zhang

(10) Patent No.: US 11,930,525 B2
(45) Date of Patent: Mar. 12, 2024

(54) RANDOM ACCESS METHOD, TERMINAL DEVICE, AND NETWORK DEVICE

(71) Applicant: HUAWEI TECHNOLOGIES CO., LTD., Guangdong (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 489 days.

(21) Appl. No.: 17/206,475

(22) Filed: Mar. 19, 2021

(65) Prior Publication Data
US 2021/0212110 A1 Jul. 8, 2021

Related U.S. Application Data

(63) Continuation of application No. PCT/CN2019/106896, filed on Sep. 20, 2019.

(30) Foreign Application Priority Data

Sep. 21, 2018 (CN) .......................... 201811110662.9

(51) Int. Cl.
*H04W 74/00* (2009.01)
*H04W 72/0453* (2023.01)
*H04W 74/08* (2009.01)

(52) U.S. Cl.
CPC ..... *H04W 74/004* (2013.01); *H04W 72/0453* (2013.01); *H04W 74/0833* (2013.01)

(58) Field of Classification Search
CPC ........... H04W 74/004; H04W 72/0453; H04W 74/0833
See application file for complete search history.

(56) References Cited

U.S. PATENT DOCUMENTS

2018/0092062 A1  3/2018 Chen
2020/0236623 A1* 7/2020 Wu ..................... H04W 74/004
2021/0176789 A1* 6/2021 Takahashi ............. H04B 7/088

FOREIGN PATENT DOCUMENTS

CN        102077676 B    10/2013
CN        103891376 A     6/2014
(Continued)

OTHER PUBLICATIONS

Samsung: "Random Access Response in NR", 3GPP Draft; R2-1704159, 3rd Generation Partnership Project (3GPP), Mobile Competence Centre ; 650, Route Des Lucioles ; F-06921 Sophia-Antipolis Cedex ; France , RAN WG2, Hangzhou, China; May 15-19, 2017, XP051274761, 4 pages.

(Continued)

*Primary Examiner* — Justin Y Lee

(57) ABSTRACT

Embodiments of this application provide a random access method, a terminal device, and a network device. The method includes: A terminal device sends random access information to a network device. The random access information is used to indicate a quantity of sending times of the random access information sent by the terminal device to the network device; or the random access information is used to indicate a random access response window length corresponding to the random access information, and the random access response window length is configurable. The terminal device detects a random access response in a random access response window. According to the random access method, the terminal device, and the network device provided in the embodiments of this application, the random access response window length can flexibly vary with the quantity of sending times of the random access information, to meet requirements of different unlicensed spectrum systems.

20 Claims, 6 Drawing Sheets

(56) References Cited

FOREIGN PATENT DOCUMENTS

| CN | 104581925 | A | 4/2015 |
| CN | 106102182 | A | 11/2016 |
| CN | 108476532 | A | 8/2018 |
| WO | 2018014257 | A1 | 1/2018 |
| WO | 2018064367 | A1 | 4/2018 |

OTHER PUBLICATIONS

Nokia et al.: "On Initial Access and Mobility for NR-U", 3GPP Draft; R1-1808951, 3rd Generation Partnership Project (3GPP), Mobile Competence Centre ; 650, Route Des Lucioles ; F-06921 Sophia-Antipolis Cedex ; France, RAN WG1, Gothenburg, Sweden; Aug. 20-24, 2018 , XP051516326, 6 pages.

Extended European Search Report dated Oct. 8, 2021 issued in European Application No. 19863778.7 (10 pages).

Fujitsu, Discussion on RAR in NR considering reciprocity issues. 3GPP TSG RAN WG1 Meeting #87 , Reno, USA Nov. 14-18, 2016, R1-1611462, 6 pages.

R1-1805017, Ericsson, On PRACH for NR in Unlicensed Spectrum, 3GPP TSG RAN WG1 Meeting #92bis, Sanya, China, Apr. 16-20, 2018, total 3 pages.

Ericsson, Random Access Response window size. 3GPP TSG-RAN WG2 NR AH#3, Vancouver, Canada, Jan. 22-26, 2018, R2-1800338, 2 pages.

R2-1807122, Nokia et al., Considerations on random access procedure for unlicensed operation, 3GPP TSG-RAN WG2 Meeting #102, Busan, South Korea, May 21-25, 2018, total 2 pages.

Office Action dated Mar. 26, 2021 issued in Chinese Application No. 201811110662.9 (14 pages).

International Search Report dated Dec. 25, 2019 issued in PCT/CN2019/106896 (9 pages).

* cited by examiner

RANDOM ACCESS METHOD, TERMINAL DEVICE, AND NETWORK DEVICE

CROSS-REFERENCE TO RELATED APPLICATIONS

This application is a continuation of International Application No. PCT/CN2019/106896, filed on Sep. 20, 2019, which claims priority to Chinese Patent Application No. 201811110662.9, filed on Sep. 21, 2018. The disclosures of the aforementioned applications are hereby incorporated by reference in their entireties.

TECHNICAL FIELD

Embodiments of this application relate to communications technologies, and in particular, to a random access method, a terminal device, and a network device.

BACKGROUND

To resolve a problem that relatively few frequency domain resources are available from a licensed spectrum, an unlicensed spectrum communications system may fully operate in an unlicensed spectrum without relying on assistance from the licensed spectrum. To be specific, a network device sends a downlink transmission (for example, control information and service data) in the unlicensed spectrum, and a terminal device sends an uplink transmission (for example, control information and service data) in the unlicensed spectrum. Currently, to share the unlicensed spectrum with another system (for example, communications systems of different operators, and a Wi-Fi network), a sending device in the unlicensed spectrum system adopts a listen before talk (LBT) channel access mechanism to use a channel resource in the unlicensed spectrum.

In the prior art, during implementation of a random access process by the terminal device, after the terminal device successfully transmits a random access preamble to the network device, the terminal device expects to receive, within a random access response window (RAR window), a random access response (RAR) sent by the network device. If the terminal device fails in receiving the RAR within the RAR window, the terminal device may continue to send the random access preamble to the network device after the RAR window corresponding to the random access preamble ends, until the terminal device successfully receives the RAR sent by the network device.

The network device in the unlicensed spectrum communications system needs to perform an LBT before sending the RAR. Therefore, the network device is unable to send the RAR to the terminal device in the RAR window if the network device fails in performing the LBT in the RAR window. Therefore, how to set an RAR window length in the unlicensed spectrum system is an urgent problem to be resolved.

SUMMARY

Embodiments of this application provide a random access method, a terminal device, and a network device to resolve a technical problem of how to set an RAR window length in an unlicensed spectrum system.

According to a first aspect, an embodiment of this application provides a random access method. In the method, a terminal device may send random access information to a network device. The random access information is used to indicate a quantity of sending times of the random access information sent by the terminal device to the network device, or the random access information is used to indicate a random access response window length corresponding to the random access information, and the random access response window length is configurable. The terminal device detects a random access response in a random access response window. For example, the terminal device sends the random access information to the network device after channel sensing succeeds.

In the foregoing method, when the terminal device needs to send the random access information repeatedly to successfully receive the RAR returned by the network device, the terminal device may, by using the random access information sent to the network device, indicate the quantity of sending times of the random access information sent by the terminal device to the network device, or indicate the RAR window length corresponding to the random access information. Each different quantity of sending times of the random access information may correspond to a different RAR window length. In this way, when the quantity of sending times of the random access information sent by the terminal device is different, the network device may send the RAR to the terminal device by using the RAR window of a different length. In this manner, the RAR window length flexibly varies with the quantity of sending times of the random access information to meet requirements of different unlicensed spectrum systems.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the terminal device may further obtain first indication information from the network device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the terminal device may further obtain third indication information from the network device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the terminal device may further obtain fifth indication information from the network device. The fifth indication information is used to indicate a mapping relationship among the quantity of sending times of the random access information, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information.

In the foregoing four manners, the random access information may, in different manners, indicate the quantity of sending times of the random access information sent by the terminal device to the network device, thereby expanding random access manners of the unlicensed spectrum system that uses a random access response window whose length is configurable.

The random access information may, in the following manners, indicate the random access response window length corresponding to the random access information:

First manner: The random access information includes a random access preamble. The random access preamble is used to indicate the random access response window length. In this manner, the terminal device may further obtain second indication information from the network device. The second indication information is used to indicate a correspondence between the random access response window length and a random access preamble set. The random access preamble set includes the random access preamble.

Second manner: The random access information includes a random access preamble. A frequency domain resource on which the random access preamble is located is used to indicate the random access response window length. In this manner, the terminal device may further obtain fourth indication information from the network device. The fourth indication information is used to indicate a correspondence between the random access response window length and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the terminal device may further obtain sixth indication information from the network device. The sixth indication information is used to indicate a correspondence among the random access response window length, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

In the foregoing four manners, the random access information may, in different manners, indicate the random access response window length corresponding to the random access information, thereby expanding the random access manners of the unlicensed spectrum system that uses a random access response window whose length is configurable.

Optionally, the method may further include: The terminal device determines the random access response window length.

For example, when the random access information is used to indicate the quantity of sending times of the random access information sent by the terminal device to the network device, the terminal device may determine the random access response window length based on the quantity of sending times of the random access information and a mapping relationship between the quantity of sending times of the random access information and the random access response window length. Therefore, in this manner, the terminal device may further obtain eighth indication information from the network device. The eighth indication information is used to indicate the mapping relationship between the quantity of sending times of the random access information and the random access response window length.

For another example, when the random access information is used to indicate the random access response window length corresponding to the random access information, the terminal device may determine the random access response window length based on the random access information and a mapping relationship between the random access information and the random access response window length. In this manner, the terminal device may further obtain ninth indication information from the network device. The ninth indication information is used to indicate the mapping relationship between the random access information and the random access response window length.

Understandably, the random access response window length differs, by a preset threshold, from a random access response window length corresponding to previously sent random access information. Alternatively, the random access response window length is m times the random access response window length corresponding to the previously sent random access information, where m is a number greater than 1. In this manner, when the terminal device fails in receiving the RAR sent by the network device, the RAR window length corresponding to the random access information sent each time may be gradually increased. In this way, the network device can obtain more time opportunities gradually to perform the LBT, thereby improving a transmission success rate of the RAR and shortening a random access delay of the terminal device.

Optionally, the method further includes: The terminal device obtains a first random access response window length from the network device. The first random access response window length is different from a random access response window length in a preset spectrum. In this manner, the first random access response window length can be flexibly configured.

Optionally, the method further includes: resetting, by the terminal device if the terminal device successfully detects the random access response in the random access response window, the quantity of sending times of the random access information, and/or resetting the random access response window length.

According to a second aspect, an embodiment of this application provides a random access method. In the method, a network device receives random access information from a terminal device. The random access information is used to indicate a quantity of sending times of the random access information sent by the terminal device to the network device, or the random access information is used to indicate a random access response window length corresponding to the access information. The random access response window length is configurable. If the network device successfully performs channel sensing in the random access response window, the network device sends a random access response to the terminal device.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the network device may further send first indication information to the terminal device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the network device may further send third indication information to the terminal device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the network device may further send fifth indication information to the terminal device. The fifth indication information is used to indicate a mapping relationship among the quantity of sending times of the random access information, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information, or the seventh indication information is used to indicate the random access response window length.

The random access information may, in the following manners, indicate the random access response window length corresponding to the random access information:

First manner: The random access information includes a random access preamble. The random access preamble is used to indicate the random access response window length. In this manner, the network device may further send second indication information to the terminal device. The second indication information is used to indicate a correspondence between the random access response window length and a random access preamble set. The random access preamble set includes the random access preamble.

Second manner: The random access information includes a random access preamble. A frequency domain resource on which the random access preamble is located is used to indicate the random access response window length. In this manner, the network device may further send fourth indication information to the terminal device. The fourth indication information is used to indicate a correspondence between the random access response window length and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the network device may further send sixth indication information to the terminal device. The sixth indication information is used to indicate a correspondence among the random access response window length, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

Optionally, the method may further include: determining, by the network device, the random access response window length.

For example, when the random access information is used to indicate the quantity of sending times of the random access information sent by the terminal device to the network device, the network device may determine the random access response window length based on the quantity of sending times of the random access information and a mapping relationship between the quantity of sending times of the random access information and the random access response window length. Therefore, in this manner, the network device sends eighth indication information to the terminal device. The eighth indication information is used to indicate the mapping relationship between the quantity of sending times of the random access information and the random access response window length.

For another example, when the random access information is used to indicate the random access response window length corresponding to the random access information, the network device may determine the random access response window length based on the random access information and a mapping relationship between the random access information and the random access response window length. Therefore, in this manner, the network device may further send ninth indication information to the terminal device. The ninth indication information is used to indicate the mapping relationship between the random access information and the random access response window length.

Understandably, the random access response window length differs, by a preset threshold, from a random access response window length corresponding to previously sent random access information. Alternatively, the random access response window length is m times the random access response window length corresponding to the previously sent random access information, and m is a number greater than 1.

Optionally, the method may further include: The network device sends a first random access response window length to the terminal device. The first random access response window length is different from a random access response window length in a preset spectrum.

Optionally, the method may further include: resetting, by the network device if the network device successfully sends the random access response to the terminal device in the random access response window, the quantity of sending times of the random access information, and/or resetting the random access response window length.

For beneficial effects of the random access method provided in the second aspect and any possible implementation of the second aspect, refer to the beneficial effects brought by the first aspect and any possible implementation of the first aspect, details of which are omitted here.

According to a third aspect, an embodiment of this application provides a terminal device. The terminal device includes: a transceiver module, configured to send random access information to a network device, where the random access information is used to indicate a quantity of sending times of the random access information sent by the terminal device to the network device, or the random access information is used to indicate a random access response window length corresponding to the random access information, and the random access response window length is configurable; and a processing module, configured to detect a random access response in a random access response window by using the transceiver module. For example, the transceiver module is specifically configured to send the random access information to the network device after the channel sensing succeeds.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the transceiver module may be further configured to obtain first indication information from the network device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the transceiver module may be further configured to obtain third indication information from the network device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the transceiver module may be further configured to obtain fifth indication information from the network device. The fifth indication information is used to indicate a mapping relationship among the quantity of sending times of the random access information, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information.

The random access information may, in the following manners, indicate the random access response window length corresponding to the random access information:

First manner: The random access information includes a random access preamble. The random access preamble is used to indicate the random access response window length. In this manner, the transceiver module may be further configured to obtain second indication information from the network device. The second indication information is used to indicate a correspondence between the random access response window length and a random access preamble set. The random access preamble set includes the random access preamble.

Second manner: The random access information includes a random access preamble. A frequency domain resource on which the random access preamble is located is used to indicate the random access response window length. In this manner, the transceiver module may be further configured to obtain fourth indication information from the network device. The fourth indication information is used to indicate a correspondence between the random access response window length and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the transceiver module may be further configured to obtain sixth indication information from the network device. The sixth indication information is used to indicate a correspondence among the random access response window length, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

Optionally, the processing module may be further configured to determine the random access response window length.

For example, when the random access information is used to indicate the quantity of sending times of the random access information sent by the terminal device to the network device, the processing module is specifically configured to determine the random access response window length based on the quantity of sending times of the random access information and a mapping relationship between the quantity of sending times of the random access information and the random access response window length. Therefore, in this manner, the transceiver module may be further configured to obtain eighth indication information from the network device. The eighth indication information is used to indicate the mapping relationship between the quantity of sending times of the random access information and the random access response window length.

For another example, when the random access information is used to indicate the random access response window length corresponding to the random access information, the processing module is specifically configured to determine the random access response window length based on the random access information and a mapping relationship between the random access information and the random access response window length. Therefore, in this manner, the transceiver module may be further configured to obtain ninth indication information from the network device. The ninth indication information is used to indicate the mapping relationship between the random access information and the random access response window length.

Understandably, the random access response window length differs, by a preset threshold, from a random access response window length corresponding to previously sent random access information. Alternatively, the random access response window length is m times the random access response window length corresponding to the previously sent random access information, and m is a number greater than 1.

Optionally, the transceiver module may be further configured to obtain a first random access response window length from the network device. The first random access response window length is different from a random access response window length in a preset spectrum.

Optionally, the processing module may be further configured to reset, when the random access response is successfully detected in the random access response window, the quantity of sending times of the random access information, and/or reset the random access response window length.

For beneficial effects of the terminal device provided in the third aspect and any possible implementation of the third aspect, refer to the beneficial effects brought by the first aspect and any possible implementation of the first aspect, details of which are omitted here.

According to a fourth aspect, an embodiment of this application provides a network device. The network device includes: a transceiver module, configured to receive random access information from a terminal device, where the random access information is used to indicate a quantity of sending times of the random access information sent by the terminal device to the network device, or the random access information is used to indicate a random access response window length corresponding to the random access information, and the random access response window length is configurable; and a processing module, configured to send, when channel sensing is successfully performed in the random access response window, a random access response to the terminal device by using the transceiver module.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the transceiver module may be further configured to send first indication information to the terminal device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the transceiver module may be further configured to send third indication information to the terminal device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the transceiver module may be further configured to send fifth indication information to the terminal device. The fifth indication information is used to indicate a mapping relationship among the quantity of sending times of the random access information, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information, or the seventh indication information is used to indicate the random access response window length.

The random access information may, in the following manners, indicate the random access response window length corresponding to the random access information:

First manner: The random access information includes a random access preamble. The random access preamble is used to indicate the random access response window length. In this manner, the transceiver module may be further configured to send second indication information to the terminal device. The second indication information is used to indicate a correspondence between the random access response window length and a random access preamble set. The random access preamble set includes the random access preamble.

Second manner: The random access information includes a random access preamble. A frequency domain resource on which the random access preamble is located is used to indicate the random access response window length. In this manner, the transceiver module may be further configured to send fourth indication information to the terminal device. The fourth indication information is used to indicate a correspondence between the random access response window length and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the transceiver module may be further configured to send sixth indication information to the terminal device. The sixth indication information is used to indicate a correspondence among the random access response window length, a random access preamble set, and a frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

Optionally, the processing module may be further configured to determine the random access response window length.

For example, when the random access information is used to indicate the quantity of sending times of the random access information sent by the terminal device to the network device, the processing module is specifically configured to determine the random access response window length based on the quantity of sending times of the random access information and a mapping relationship between the quantity of sending times of the random access information and the random access response window length. In this manner, the transceiver module may be further configured to send eighth indication information to the terminal device. The eighth indication information is used to indicate the mapping relationship between the quantity of sending times of the random access information and the random access response window length.

For another example, when the random access information is used to indicate the random access response window length corresponding to the random access information, the processing module is specifically configured to determine the random access response window length based on the random access information and a mapping relationship between the random access information and the random access response window length. In this manner, the transceiver module may be further configured to send ninth indication information to the terminal device. The ninth indication information is used to indicate the mapping relationship between the random access information and the random access response window length.

Understandably, the random access response window length differs from a random access response window length corresponding to previously sent random access information by a preset threshold. Alternatively, the random access response window length is m times the random access response window length corresponding to the previously sent random access information, where m is a number greater than 1.

Optionally, the transceiver module may be further configured to send a first random access response window length to the terminal device. The first random access response window length is different from a random access response window length in a preset spectrum.

Optionally, the processing module may be further configured to reset, when the random access response is successfully sent to the terminal device in a random access response window by using the transceiver module, the quantity of sending times of the random access information, and/or reset the random access response window length.

For beneficial effects of the network device provided in the fourth aspect and any possible implementation of the fourth aspect, refer to the beneficial effects brought by the first aspect and any possible implementation of the first aspect, details of which are omitted here.

According to a fifth aspect, an embodiment of this application provides a terminal device. The terminal device includes a processor, a memory, a receiver, and a transmitter. Both the receiver and the transmitter are coupled to the processor. The processor controls a receiving action of the receiver, and the processor controls a sending action of the transmitter.

The memory is configured to store computer-executable program code. The program code includes an instruction. When the processor executes the instruction, the terminal device is enabled to perform the method provided in the first aspect or any possible implementation of the first aspect.

According to a sixth aspect, an embodiment of this application provides a network device. The network device includes a processor, a memory, a receiver, and a transmitter. Both the receiver and the transmitter are coupled to the processor. The processor controls a receiving action of the receiver, and the processor controls a sending action of the transmitter.

The memory is configured to store computer-executable program code. The program code includes an instruction. When the processor executes the instruction, the network device is enabled to perform the method provided in the second aspect or any possible implementation of the second aspect.

According to a seventh aspect, an embodiment of this application provides a communications apparatus, including units, modules, or circuits configured to perform the method provided in the first aspect or any possible implementation of the first aspect. The communications apparatus may be a terminal device, or may be a module used in the terminal device, for example, may be a chip used in the terminal device.

According to an eighth aspect, an embodiment of this application provides a communications apparatus, including units, modules, or circuits configured to perform the method provided in the second aspect or any possible implementation of the second aspect. The communications apparatus may be a network device, or may be a module used in the network device, for example, may be a chip used in the network device.

According to a ninth aspect, an embodiment of this application provides a computer program product including an instruction. When the computer program product runs on a computer, the computer is enabled to perform the method according to the first aspect or any possible implementation of the first aspect.

According to a tenth aspect, an embodiment of this application provides a computer program product including an instruction. When the computer program product runs on a computer, the computer is enabled to perform the method according to the second aspect or any possible implementation of the second aspect.

According to an eleventh aspect, an embodiment of this application provides a computer-readable storage medium. The computer-readable storage medium stores an instruction. When the instruction is run on a computer, the computer is enabled to perform the method according to the first aspect or any possible implementation of the first aspect.

According to a twelfth aspect, an embodiment of this application provides a computer-readable storage medium. The computer-readable storage medium stores an instruction. When the instruction is run on a computer, the computer is enabled to perform the method according to the second aspect or any possible implementation of the second aspect.

According to a thirteenth aspect, an embodiment of this application provides a chip. A computer program is stored on the chip. When the computer program is executed by the chip, the computer program performs the method according to the first aspect or any possible implementation of the first aspect.

According to a fourteenth aspect, an embodiment of this application provides a chip. A computer program is stored on the chip. When the computer program is executed by the chip, the computer program performs the method according to the second aspect or any possible implementation of the second aspect.

With the random access method, the terminal device, and the network device provided in the embodiments of this application, when the terminal device needs to send the random access information repeatedly to successfully receive the RAR returned by the network device, the terminal device may, by using the random access information sent to the network device, indicate the quantity of sending times of the random access information sent by the terminal device to the network device, or indicate the RAR window length corresponding to the random access information. Each different quantity of sending times of the random access information may correspond to a different RAR window length. In this way, when the quantity of sending times of the random access information sent by the terminal device is different, the network device may send the RAR to the terminal device by using the RAR window of a different length. In this manner, the RAR window length flexibly varies with the quantity of sending times of the random access information to meet requirements of different unlicensed spectrum systems.

DESCRIPTION OF EMBODIMENTS

Figure 1:
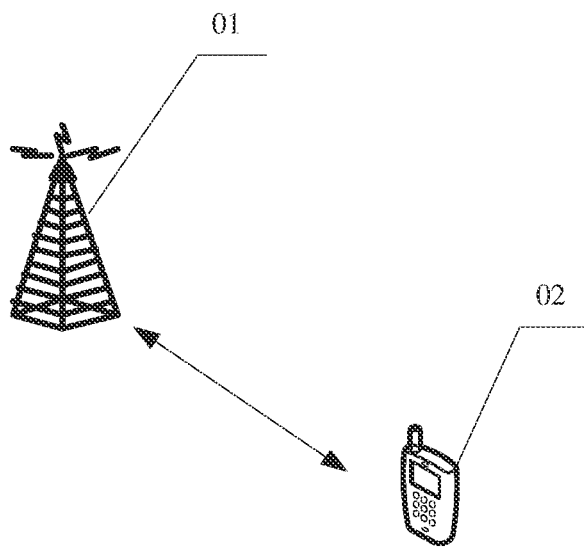
FIG. 1 is a framework diagram of a communications system according to an embodiment of this application.

FIG. 1 is a framework diagram of a communications system according to an embodiment of this application. As shown in FIG. 1, the communications system includes a network device 01 and a terminal device 02.

The network device 01 may be a base station, or various wireless access points, or may be a device in communication with a terminal device via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be a base transceiver station (BTS) in the Global System of Mobile communication (GSM) or Code Division Multiple Access (CDMA), or may be a NodeB (NB) in a Wideband Code Division Multiple Access ( ), or may be an evolved NodeB (evolutional node B, eNB or eNodeB) in Long Term Evolution (LTE), or may be a relay station or an access point, or may be a next-generation NodeB (gNB) in a future 5G network, or the like. This is not limited herein.

A terminal device 02 may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, user equipment (or user device), or a sensor with a network access function. This is not limited herein.

To resolve a problem that relatively few frequency domain resources are available from a licensed spectrum, the communications system may fully operate in an unlicensed spectrum without relying on assistance from the licensed spectrum. To be specific, a network device sends a downlink transmission (for example, control information and service data) in the unlicensed spectrum, and a terminal device sends an uplink transmission (for example, control information and service data) in the unlicensed spectrum. In an embodiment of this application, the communications system operating in the unlicensed spectrum may be referred to as an unlicensed spectrum system. The unlicensed spectrum system referred to herein may be a Long Term Evolution-Unlicensed (LTE-U) system, a New Radio-Unlicensed (NR-U) system, or a Wi-Fi network, or may be another communications system that operates in an unlicensed spectrum in the future. This is not limited herein.

To share the unlicensed spectrum with another system (for example, communications systems of different operators, and a Wi-Fi network), a sending device in the unlicensed spectrum system adopts a listen before talk (LBT) channel access mechanism to use a channel resource in the unlicensed spectrum.

Specifically, before sending a transmission, the sending device senses a channel first. When the channel is sensed idle (that is, when channel sensing succeeds or an LBT succeeds), the sending device can obtain a right to use the channel. That is, the sending device can send a data transmission (control information and/or service data) to a receiving device on the channel. When the channel is sensed busy (that is, the channel sensing fails or the LBT fails), the sending device abandons sending the data transmission to the receiving device on the channel. Understandably, the sending device referred to herein may be a network device or a terminal device. Specifically, if the device initiating the LBT is a network device, the sending device is a network device and the receiving device is a terminal device. If the device initiating the LBT is a terminal device, the sending device is a terminal device and the receiving device is a network device.

Currently, the following two types of channel sensing are available:

The first type of channel sensing is long-duration channel sensing. To be specific, when the sending device performs the first type of channel sensing, a duration from starting of the channel sensing to a success of the channel sensing is relatively long. In some embodiments, the first type of channel sensing may also be referred to as type 1 channel access. Currently, common examples of the first type of channel sensing include random backoff-based clear channel assessment (CCA).

A random backoff-based CCA process performed by the sending device may be: the sending device may evenly and randomly generate a backoff counter N between 0 to an initial contention window size (CWS), and perform channel sensing at a granularity of sensing slots (for example, a duration of 9 µs).

If the channel is sensed idle in the sensing slot, the sending device decreases the backoff counter by 1. If the channel is sensed busy in the sensing slot, the sending device suspends the backoff counter without decreasing by 1. To be specific, a value of the backoff counter remains unchanged during a busy time of the channel, and the backoff counter is not counted down again until the channel is sensed idle. In specific implementation, the sending device may compare power received on the channel in the sensing slot with an energy detection threshold (CCA-energy detection, CCA-ED). If the power on the channel is greater than or equal to the CCA-ED, it is determined that the channel is busy; or, if the power on the channel is less than the CCA-ED, it is determined that the channel is idle.

When the backoff counter is reset to zero, the sending device may determine that the channel sensing succeeds (also referred to as a success of LBT sensing). In this scenario, the sending device may immediately occupy the channel to send control information and/or service data. In some embodiments, the sending device may alternatively wait for a period of time after the backoff counter is reset to zero. After the waiting ends, the sending device may use an additional slot (for example, 9 µs or 25 µs+9×k µs, where k is zero or a positive integer) to sense the channel in another attempt. If the sending device senses the channel idle in the additional slot, the sending device may determine that the channel sensing succeeds. In this scenario, the sending device may immediately occupy the channel to send control information and/or service data.

If the sending device does not complete resetting the backoff counter before a time point of a desired time domain resource, or, if the sending device completes resetting the backoff counter before the time point of the desired time domain resource but senses the channel busy in the additional sensing slot, the sending device may determine that the channel sensing fails (also referred to as a failure of LBT sensing). In this case, the sending device abandons sending the control information and/or the service data on the channel.

A second type of channel sensing is short-duration channel sensing. To be specific, when the sending device performs the second type of channel sensing, a duration from starting of the channel sensing to the success of the channel sensing is relatively short. In some embodiments, the second type of channel sensing may also be referred to as type 2 channel access. Currently, common examples of the second type of channel sensing include single-slot CCA. In some embodiments, the single-slot CCA is also referred to as one-shot CCA or 25 µs CCA.

A single-slot CCA process performed by the sending device may be: the sending device performs single-slot sensing on the channel for a preset time length (for example, 25 µs). If the sending device senses the channel idle in the single slot, the sending device determines that the channel sensing succeeds. In this scenario, the sending device may immediately occupy the channel to send control information and/or service data. If the sending device senses the channel busy in the single slot, the sending device determines that the channel sensing fails. In this scenario, the sending device abandons sending the transmission on the channel. In specific implementation, the sending device may compare the power received on the channel in the single slot with the CCA-ED. If the power on the channel is greater than or equal to the CCA-ED, it is determined that the channel is busy; or, if the power on the channel is less than the CCA-ED, it is determined that the channel is idle.

Understandably, the second type of channel sensing may alternatively be other channel sensing that enables quick sensing on a channel. This is not limited herein. In addition, without being limited to 25 µs, a sensing duration of the second type of channel sensing may be a longer or shorter duration. Without being limited to 1, a count of sensing in the second type of channel sensing may be 2, 3, or more. This is not specifically limited herein.

After the channel sensing succeeds, the sending device can obtain the right to use the channel, and obtain a corresponding channel occupation time (COT) at the same time. In different embodiments, the channel occupation time (COT) obtained by the sending device may be less than or equal to a maximum channel occupation time (MCOT), or may be less than or equal to a transmission opportunity (TXOP). In other words, the channel occupation time (COT) obtained by the sending device may be any time length less than or equal to MCOT, or may be any time length less than or equal to TXOP.

Understandably, when the sending device is a network device, a transmission performed within a corresponding channel occupation time is a downlink transmission. When the sending device is a terminal device, a transmission performed within a corresponding channel occupation time is an uplink transmission. Optionally, the sending device may share the obtained channel use right within the channel occupation time with another device. For example, when the sending device is a network device, the network device may share the channel use right with the terminal device, that is, allow the terminal device to perform a transmission within the channel occupation time. In other words, in some embodiments, switching between an uplink transmission and a downlink transmission may occur in a channel occupation time.

Currently, during implementation of a random access process by the terminal device in an unlicensed spectrum system, after the terminal device successfully transmits a random access preamble to the network device, the terminal device expects to receive, within a random access response window (RAR window), a random access response (RAR) sent by the network device. If the terminal device fails in receiving the RAR within the RAR window, the terminal device may continue to send the random access preamble to the network device after the RAR window corresponding to the random access preamble ends, until the terminal device successfully receives the RAR sent by the network device. A cause for the failure of the terminal device to receive the RAR in the RAR window may be, for example, the network device fails in performing an LBT in the RAR window, and therefore, is unable to send the RAR to the terminal device.

Alternatively, the cause is: the network device successfully sends the RAR to the terminal device in the RAR window, but the terminal device fails in receiving the RAR due to a relatively strong channel interference. Alternatively, the cause is: the network device fails in receiving the random access preamble sent by the terminal device.

Figure 2:
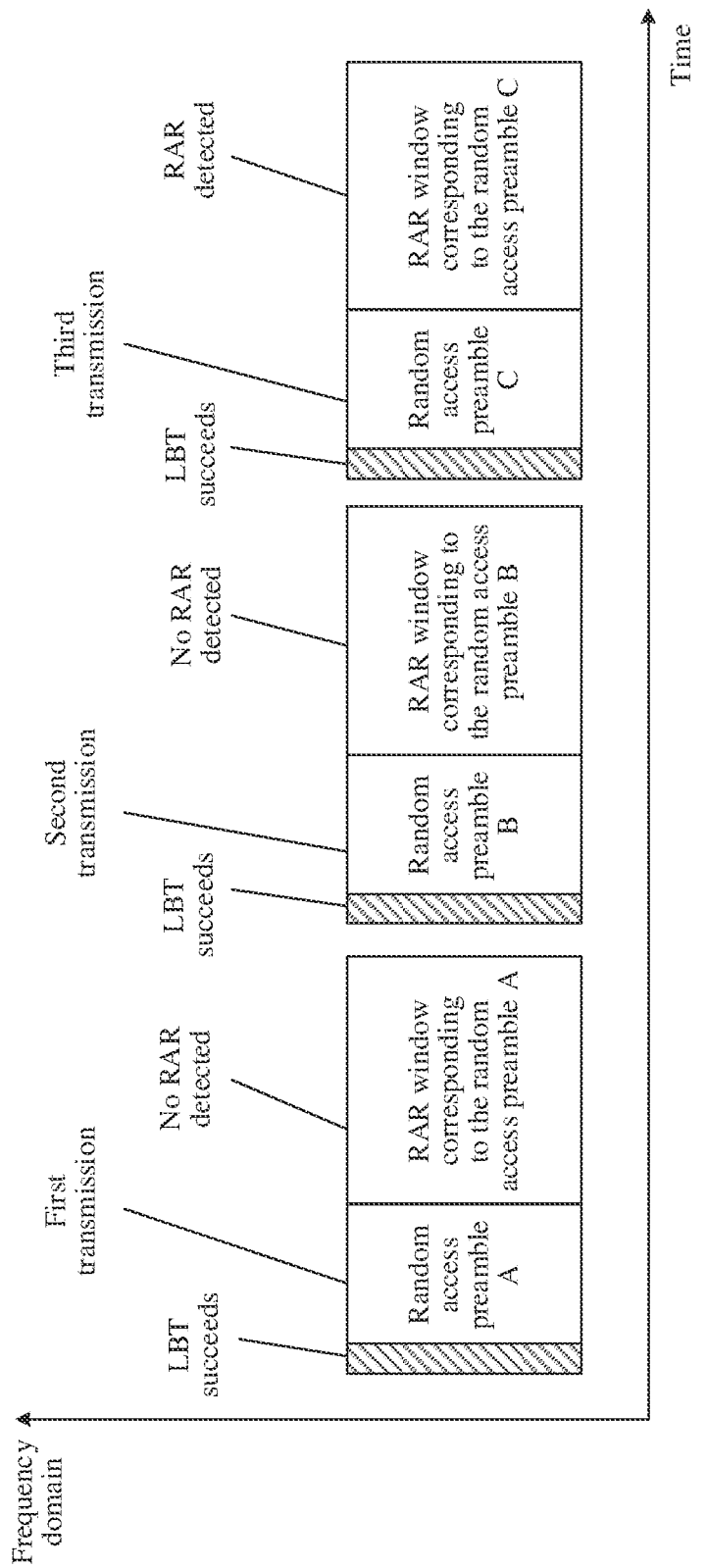
FIG. 2 is a schematic diagram of a time-frequency resource.

The following describes a process of receiving a random access response by the terminal device in an unlicensed spectrum system, using an example in which the terminal device successfully receives an RAR returned by the network device after the random access preamble is sent for a third time. FIG. 2 is a schematic diagram of a time-frequency resource. As shown in FIG. 2, during implementation of a random access process, the terminal device may send a random access preamble A to the network device after the LBT succeeds. Subsequently, the terminal device may detect the RAR in an RAR window corresponding to the random access preamble A. If the terminal device fails in receiving the RAR in the RAR window, the terminal device continues to perform an LBT after the RAR window ends, and sends a random access preamble B to the network device again after the LBT succeeds. Subsequently, the terminal device may detect the RAR in an RAR window corresponding to the random access preamble B. The RAR window corresponding to the random access preamble A may start after an offset configured by a network device. The RAR window corresponding to the random access preamble B may also start after a same or different offset configured by a network device. If the terminal device fails in receiving the RAR in the RAR window corresponding to the random access preamble B, the terminal device continues to perform an LBT after the RAR window ends, and sends a random access preamble C to the network device again after the LBT succeeds. Subsequently, the terminal device may detect the RAR in an RAR window corresponding to the random access preamble C. In this example, the terminal device successfully detects, in the RAR window corresponding to the random access preamble C, the RAR sent by the network device.

As can be learned from the foregoing example, in the unlicensed spectrum system, when performing a random access process, the terminal device may send the random access preamble to the network device repeatedly to successfully receive the RAR returned by the network device. In this scenario, if the RAR window length in the unlicensed spectrum system is set to a relatively large value, the network device can obtain more time opportunities to perform the LBT, thereby improving the transmission success rate of the RAR. However, if the terminal device fails in receiving the RAR in the RAR window, the terminal device needs to wait for the relatively long RAR window to end before starting a new transmission of the random access preamble. Consequently, a random access delay of the terminal device is relatively high. If the RAR window length in the unlicensed spectrum system is set to a relatively short value, opportunities of the network device to perform the LBT in the RAR window are reduced, and therefore, the transmission success rate of the RAR is reduced. Therefore, an efficient method for setting an appropriate RAR window length in the unlicensed spectrum system is lacking.

In view of the foregoing problem, an embodiment of this application provides a random access method. In the method, when the terminal device needs to send the random access information repeatedly to successfully receive the RAR returned by the network device, the terminal device may, by using the random access information sent to the network device, indicate the quantity of sending times of the random access information sent by the terminal device to the network device, or indicate the RAR window length corresponding to the random access information. Each different quantity of sending times of the random access information may correspond to a different or non-exactly same RAR window length. In this way, when the quantity of sending times of the random access information sent by the terminal device reaches a different value, the network device may send the RAR to the terminal device by using the RAR window of a different or non-exactly same length. Understandably, the quantity of sending times of the random access information is a quantity of sending times of the random access information cumulatively sent by the terminal device to the network device.

In other words, in this embodiment of this application, the RAR window length is not fixed, but is configurable. In other words, the RAR window length may have a plurality of values, and each different value corresponds to a different quantity of sending times of the random access information. An RAR window length corresponding to the random access information sent for an $x^{th}$ time may be different from an RAR window length corresponding to the random access information sent for a $y^{th}$ time, where x is not equal to y. Alternatively, the RAR window length corresponding to the random access information sent for the $x^{th}$ time may be the same as the RAR window length corresponding to the random access information sent for the $y^{th}$ time. The RAR window length corresponding to the random access information sent for the $y^{th}$ time may be different from an RAR window length corresponding to the random access information sent for a $z^{th}$ time. In the description above, x is not equal to y, x is not equal to z, and y is not equal to z. In this manner, the RAR window length flexibly varies with the quantity of sending times of the random access information to meet requirements of the unlicensed spectrum system.

Understandably, the random access response window length being configurable may be understood as: the random access response window length may be preconfigured, or may be indicated by the network device to the terminal device by using signaling. The term "configurable" means being configurable to a fixed length, or configurable to different lengths, or configurable to non-exactly same lengths, or the like. This is not limited in this embodiment of this application.

Specific embodiments are used below to describe in detail the technical solutions of the embodiments of this application. The following several specific embodiments may be combined with each other, and a same or similar concept or process may not be described repeatedly in some embodiments.

Figure 3:
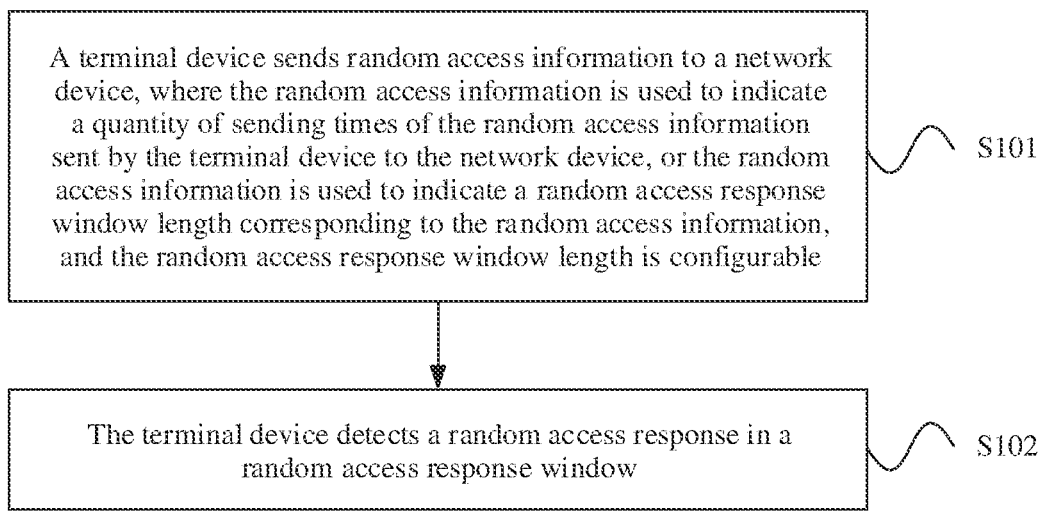
FIG. 3 is a schematic flowchart of a random access method according to an embodiment of this application.

FIG. 3 is a schematic flowchart of a random access method according to an embodiment of this application. As shown in FIG. 3, the method includes the following steps.

S101. A terminal device sends random access information to a network device. The random access information is used to indicate a quantity of sending times of the random access information sent by the terminal device to the network device, or the random access information is used to indicate a random access response window length corresponding to the random access information. The random access response window length is configurable.

S102. The terminal device detects a random access response in a random access response window.

Specifically, the terminal device may send the random access information to the network device after channel sensing succeeds. The random access information may indicate the quantity of sending times of the random access information sent by the terminal device to the network device. Each different quantity of sending times corresponds to a different RAR window length. For example, an RAR window length corresponding to a quantity of sending times 2 is larger than an RAR window length corresponding to a quantity of sending times 1, an RAR window length corresponding to a quantity of sending times 3 is larger than the RAR window length corresponding to the quantity of sending times 2, and so on. Alternatively, the RAR window length corresponding to the quantity of sending times 2 is equal to the RAR window length corresponding to the quantity of sending times 1, the RAR window length corresponding to the quantity of sending times 3 is larger than the RAR window length corresponding to the quantity of sending times 2, an RAR window length corresponding to a quantity of sending times 4 is equal to the RAR window length corresponding to the quantity of sending times 3, an RAR window length corresponding to a quantity of sending times 5 is larger than the RAR window length corresponding to the quantity of sending times 4, and so on.

In specific implementation, the random access information may, in the following manners, indicate the quantity of sending times of the random access information sent by the terminal device to the network device:

First manner: The random access information includes a random access preamble (preamble code). The random access preamble is used to indicate quantity of sending times of the random access information.

Optionally, available random access preambles between the terminal device and the network device may be pre-grouped, so that each random access preamble corresponds to one quantity of sending times of the random access information. In other words, there is a mapping relationship between the random access preamble and the quantity of sending times of the random access information. For example, the mapping relationship may be shown in Table 1.

TABLE 1

| Serial number | Random access preamble | Quantity of sending times of the random access information |
|---|---|---|
| 1 | Random access preamble 1 | 1 |
| 2 | Random access preamble 2 | 1 |
| 3 | Random access preamble 3 | 2 |
| ... | ... | ... |
| n | Random access preamble N | M |

Both M and N are positive integers, and M is less than or equal to N. In the mapping relationship, one quantity of sending times may correspond to a plurality of random access preambles.

Understandably, each quantity of sending times of the random access information may correspond to a same quantity of random access preambles or a different quantity of random access preambles. In specific implementation, the quantity of random access preambles corresponding to each quantity of sending times of the random access information may be configured according to an actual use requirement, so that the quantity of random access preambles corresponding to each quantity of sending times of the random access information can meet the actual use requirement. For example, the quantity of random access preambles corresponding to each quantity of sending times of the random access information may be configured based on the following principle: the larger the value of the quantity of sending times of the random access information, the smaller the quantity of random access preambles corresponding to the quantity of sending times of the random access information.

The mapping relationship between the random access preamble and the quantity of sending times of the random access information may be preset in the terminal device and the network device, or may be sent by the network device to the terminal device. For example, the network device may send indication information to the terminal device. The indication information is used to indicate the mapping relationship between the random access preamble and the quantity of sending times of the random access information. Correspondingly, the terminal device may obtain the indication information from the network device. For example, the network device may send the indication information to the terminal device by using signaling. The signaling is, for example, any one of the following: radio resource control (RRC) signaling, media access control (MAC) signaling, physical layer signaling, or the like.

In this way, the terminal device may, based on a quantity of sending times of the random access information currently sent by the terminal device, and based on the mapping relationship between the random access preamble and the quantity of sending times of the random access information, determine a random access preamble corresponding to the quantity of sending times of the currently sent random access information. In addition, after channel sensing succeeds, the terminal device may send the random access information that includes the random access preamble to the network device, to indicate the quantity of sending times of the random access information by using the random access preamble. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the random access preamble in the random access information and the mapping relationship between the random access preamble and the quantity of sending times of the random access information. Subsequently, the network device may perform channel sensing in the RAR window of the length corresponding to the quantity of sending times. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available random access preambles between the terminal device and the network device may be pre-grouped based on preset bits of the random access preambles, so that the random access preambles can represent corresponding quantity of sending times. For example, random access preambles with a same bit value correspond to one quantity of sending times of the random access information, and random access preambles with different bit values correspond to different quantity of sending times of the random access information. In other words, there is a mapping relationship between a preset bit of a random access preamble and the quantity of sending times of the random access information.

Understandably, each quantity of sending times of the random access information may correspond to a same quantity of random access preambles or a different quantity of random access preambles, specifically depending on the quantity of random access preambles corresponding to the bit.

The mapping relationship between the preset bit of the random access preamble and the quantity of sending times of the random access information may be preset in the terminal device and the network device, or may be sent by the network device to the terminal device. For example, the network device may send indication information to the terminal device. The indication information is used to indicate the mapping relationship between the preset bit of the random access preamble and the quantity of sending times of the random access information. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

Optionally, the random access information may further include a random access preamble and additional bit information, so that the random access information including the additional bit information can represent a corresponding quantity of sending times. The additional bit information can implement the same function as the preset bit, or may also be indicated by using signaling in a way similar to how the preset bit is indicated.

In this way, the terminal device may, based on a quantity of sending times of the random access information currently sent by the terminal device, and based on the mapping relationship between the preset bit of the random access preamble and the quantity of sending times of the random access information, determine a random access preamble corresponding to the quantity of sending times of the currently sent random access information. In addition, the terminal device may send the random access information that includes the random access preamble to the network device, to indicate the quantity of sending times of the random access information by using the random access preamble. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the preset bit of the random access preamble in the random access information and the mapping relationship between the preset bit of the random access preamble and the quantity of sending times of the random access information. Subsequently, the network device may perform channel sensing in the RAR window of the length corresponding to the quantity of sending times. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available random access preambles between the terminal device and the network device may be further pre-grouped into a plurality of random access preamble sets. The grouping into the preamble sets may be performed based on information such as different root sequences and different cyclic shifts. For example, random access preambles corresponding to the same root sequence may be grouped into the same random access preamble set. Alternatively, random access preambles corresponding to the same cyclic shift quantity may be grouped into the same random access preamble set. Alternatively, random access preambles corresponding to the same root sequence and corresponding to the same cyclic shift quantity may be grouped into the same random access preamble set. Alternatively, some random access preambles are randomly selected and grouped into the same random access preamble set. In some embodiments, the set may also be referred to as a group, a category, a series, a resource pool, a pool, or the like, details of which are omitted here. Understandably, the random access preamble set mentioned in this embodiment of this application may include at least one random access preamble.

Each random access preamble set formed above may correspond to one quantity of sending times of the random access information. In other words, there is a mapping relationship between the random access preamble set and the quantity of sending times of the random access information. In an example in which there are 6 random access preamble sets, the mapping relationship may be shown in Table 2.

TABLE 2

| Serial number | Random access preamble set | Quantity of sending times of the random access information |
|---|---|---|
| 1 | Random access preamble set 1 | 1 |
| 2 | Random access preamble set 2 | 2 |
| 3 | Random access preamble set 3 | 3 |
| 4 | Random access preamble set 4 | 4 |
| 5 | Random access preamble set 5 | 5 |
| 6 | Random access preamble set 6 | 6 |

Understandably, in the mapping relationship in some embodiments, one quantity of sending times may correspond to a plurality of random access preamble sets, or one random access preamble set.

Understandably, each random access preamble set may include a same quantity of random access preambles or a different quantity of random access preambles. In specific implementation, the quantity of random access preambles included in each random access preamble set may be configured according to an actual use requirement, so that the quantity of random access preambles corresponding to each quantity of sending times of the random access information can meet the actual use requirement. For example, the quantity of random access preambles included in each random access preamble set may be configured based on the following principle: the larger the value of the quantity of sending times of the random access information, the smaller the quantity of random access preambles included in the random access preamble set corresponding to the quantity of sending times of the random access information.

The mapping relationship between the random access preamble set and the quantity of sending times of the random access information may be preset in the terminal device and the network device, or may be sent by the network device to the terminal device. For example, the network device may send indication information to the terminal device. The indication information is used to indicate the mapping relationship between the random access preamble set and the quantity of sending times of the random access information. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on a quantity of sending times of the random access information currently sent by the terminal device, and based on the mapping relationship between the quantity of sending times of the random access information and the random access set, determine a random access preamble set corresponding to the quantity of sending times of the currently sent random access information. Subsequently, the terminal device may select a random access preamble from the set, and send random access information including the random access preamble to the network device, to indicate the quantity of sending times of the random access information by using the set that includes the random access preamble. After sending the random access information, the terminal device may detect the RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the random access preamble in the random access information and the mapping relationship between the quantity of sending times of the random access information and the random access set. Subsequently, the network device may perform channel sensing in the RAR window of the length corresponding to the quantity of sending times. Alternatively, correspondingly, if the network device successfully receives the random access information sent by the terminal device, the network device determines, based on the random access preamble in the random access information and the mapping relationship between a corresponding RAR window of the random access information and the random access set, an RAR window of a length corresponding to the random access information, and performs channel sensing in the window. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Second manner: The random access information includes a random access preamble, and a frequency domain resource on which the random access preamble is located is used to indicate the quantity of sending times of the random access information. Understandably, the frequency domain resource in this embodiment of this application may also be referred to as an interlace resource, or a physical resource block (PRB) of an interlace structure, or a resource element (RE) of an interlace structure, or a sub-PRB of an interlace structure, or an interlaced PRB, or an interlaced RE, or an interlaced sub-PRB, or the like. Alternatively, the frequency domain resource may be at another interleaved frequency domain resource granularity. This is not limited in this embodiment of this application. For example, the frequency domain resource may be at a frequency domain resource granularity that is universally applicable in an LTE system or a 5G system. In addition, the resource element may also be referred to as a physical resource element. The sub-PRB may be a PRB subset smaller than one PRB, and includes a plurality of REs.

Optionally, the available frequency domain resources used to transmit random access preambles between the terminal device and the network device may be pre-grouped, so that each frequency domain resource corresponds to one quantity of sending times of the random access information. In other words, there is a mapping relationship between a frequency domain resource used to transmit the random access preamble and the quantity of sending times of the random access information. For example, the mapping relationship may be shown in Table 3.

TABLE 3

| Serial number | Frequency domain resource used to transmit a random access preamble | Quantity of sending times of the random access information |
| --- | --- | --- |
| 1 | Frequency domain resource 1 | 1 |
| 2 | Frequency domain resource 2 | 1 |
| 3 | Frequency domain resource 3 | 2 |
| ... | ... | ... |
| n | Frequency domain resource A | B |

Both A and B are positive integers, and B is less than or equal to A. In the mapping relationship, one quantity of sending times may correspond to a plurality of frequency domain resources.

Understandably, each quantity of sending times of the random access information may correspond to a same quantity of frequency domain resources or a different quantity of frequency domain resources. In specific implementation, the quantity of frequency domain resources corresponding to each quantity of sending times of the random access information may be configured according to an actual use requirement, so that the quantity of frequency domain resources corresponding to each quantity of sending times of the random access information can meet the actual use requirement. For example, the quantity of frequency domain resources corresponding to each quantity of sending times of the random access information may be configured based on the following principle: the larger the value of the quantity of sending times of the random access information, the smaller the quantity of frequency domain resources corresponding to the quantity of sending times of the random access information.

The mapping relationship between the frequency domain resource used to transmit the random access preamble and the quantity of sending times of the random access information may be preset in the terminal device and the network device, or may be sent by the network device to the terminal device. For example, the network device may send indication information to the terminal device. The indication information is used to indicate the mapping relationship between the frequency domain resource used to transmit the random access preamble and the quantity of sending times of the random access information. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on a quantity of sending times of the random access information currently sent by the terminal device, and based on the mapping relationship between the frequency domain resource used to transmit the random access preamble and the quantity of sending times of the random access information, determine a frequency domain resource currently used for sending the random access information to the network device. In addition, the terminal device may send the random access information to the network device by using the frequency domain resource, to indicate the quantity of sending times of the random access information by using the frequency domain resource. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the frequency domain resource on which the random access information is located and based on the mapping relationship between the frequency domain resource used to transmit the random access preamble and the quantity of sending times of the random access information. Subsequently, the network device may perform channel sensing in the RAR window of the length corresponding to the quantity of sending times. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available frequency domain resources used to transmit the random access preambles between the terminal device and the network device may be further pre-grouped into a plurality of frequency domain resource sets. Frequency domain resources included in a same frequency domain resource set may be consecutive frequency domain resources, or may be inconsecutive frequency domain resources. In some embodiments, the set may also be referred to as a group, a category, a series, a resource pool, a pool, or the like, details of which are omitted here. Understandably, the frequency domain resource set in this embodiment of this application may include at least one frequency domain resource.

Each frequency domain resource set formed above may correspond to one quantity of sending times of the random access information. In other words, there is a mapping relationship between the frequency domain resource set and the quantity of sending times of the random access information. In an example in which there are 4 frequency domain resource sets, the mapping relationship may be shown in Table 4.

TABLE 4

| Serial number | Frequency domain resource set | Quantity of sending times of the random access information |
| --- | --- | --- |
| 1 | Frequency domain resource set 1 | 1 |
| 2 | Frequency domain resource set 2 | 2 |
| 3 | Frequency domain resource set 3 | 3 |
| 4 | Frequency domain resource set 4 | 4 |

Understandably, in the mapping relationship, one quantity of sending times may correspond to a plurality of frequency domain resource sets or one frequency domain resource set.

Understandably, each frequency domain resource set may include a same quantity of frequency domain resources or a different quantity of frequency domain resources. In specific implementation, the quantity of random access preambles included in each frequency domain resource set may be configured according to an actual use requirement, so that the quantity of frequency domain resources corresponding to each quantity of sending times of the random access information can meet the actual use requirement. For example, the quantity of frequency domain resources included in each frequency domain resource set may be configured based on the following principle: the larger the value of the quantity of sending times of the random access information, the smaller the quantity of frequency domain resources included in the frequency domain resource set corresponding to the quantity of sending times of the random access information.

For example, 128 frequency domain resources are available for transmitting the random access preamble between the terminal device and the network device, and are grouped into 4 frequency domain resource sets. Therefore, each frequency domain resource set may include 32 frequency domain resources. Alternatively, the frequency domain resource set 1 includes more frequency domain resources than the frequency domain resource set 2, the frequency domain resource set 2 includes more frequency domain resources than the frequency domain resource set 3, and the frequency domain resource set 3 includes more frequency domain resources than the frequency domain resource set 4.

The mapping relationship between the frequency domain resource set and the quantity of sending times of the random access information may be preset in the terminal device and the network device, or may be sent by the network device to the terminal device. For example, the network device may send indication information to the terminal device. The indication information is used to indicate the mapping relationship between the frequency domain resource set and the quantity of sending times of the random access information. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on a quantity of sending times of the random access information currently sent by the terminal device, and based on the mapping relationship between the frequency domain resource set and the quantity of sending times of the random access information, determine a frequency domain resource set corresponding to the quantity of sending times of the currently sent random access information. Subsequently, the terminal device may select a frequency domain resource from the set, and send the random access information to the network device by using the frequency domain resource, to indicate the quantity of sending times of the random access information by using the frequency domain resource set that includes the frequency domain resource used to transmit the random access information. After sending the random access information, the terminal device may detect the RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the frequency domain resource used to transmit the random access information and the mapping relationship between the frequency domain resource set and the quantity of sending times of the random access information. Subsequently, the network device may perform channel sensing in the RAR window of the length corresponding to the quantity of sending times. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Third manner: The random access information includes a random access preamble. The random access preamble and a frequency domain resource on which the random access preamble is located are used to indicate the quantity of sending times of the random access information. In other words, the random access preamble and the frequency domain resource on which the random access preamble is located are used together to indicate the quantity of sending times of the random access information. In this manner, limited random access preambles and limited frequency domain resources can be used to indicate more quantity of sending times.

Optionally, the available random access preambles between the terminal device and the network device may be pre-grouped, and the available frequency domain resources used to transmit the random access preambles between the terminal device and the network device may be pre-grouped, so that the random access information including a same random access preamble is used to indicate different quantity of sending times of the random access information when being sent by using different frequency domain resources. For example, when the random access information including a random access preamble A is sent by using a frequency domain resource 1, the random access information is used to indicate that the quantity of sending times of the random information is 2. When the random access information including the random access preamble A is sent by using a frequency domain resource 2, the random access information is used to indicate that the quantity of sending times of the random information is 4, and so on.

For details of how to group the random access preambles and the frequency domain resources used to transmit the random access preambles, refer to descriptions in the first manner and the second manner above. In the example described below, the available random access preambles between the terminal device and the network device are pre-grouped into a plurality of random access preamble sets, and the available frequency domain resources used to transmit the random access preambles between the terminal device and the network device are pre-grouped into a plurality of frequency domain resource sets. Specifically:

The available random access preambles between the terminal device and the network device may be grouped into a plurality of random access preamble sets. For example, random access preambles corresponding to the same root sequence may be grouped into the same random access preamble set. Alternatively, random access preambles corresponding to the same cyclic shift quantity may be grouped into the same random access preamble set. Alternatively, random access preambles corresponding to the same root sequence and corresponding to the same cyclic shift quantity may be grouped into the same random access preamble set. Alternatively, some random access preambles are randomly selected and grouped into the same random access preamble set.

Correspondingly, the available frequency domain resources used to transmit the random access preambles between the terminal device and the network device may be grouped into a plurality of frequency domain resource sets. Frequency domain resources included in a same frequency domain resource set may be consecutive frequency domain resources, or may be inconsecutive frequency domain resources.

In some embodiments, the set may also be referred to as a group, a category, a series, a resource pool, a pool, or the like, details of which are omitted here.

Each formed combination of the random access preamble set and the frequency domain resource set may correspond to one quantity of sending times of the random access information. In other words, there is a mapping relationship between the random access preamble set and the frequency domain resource set and the quantity of sending times of the random access information. In an example in which there are 4 frequency domain resource sets and 2 random access preamble sets, the mapping relationship may be shown in Table 5.

TABLE 5

| Serial number | Random access preamble set | Frequency domain resource set | Quantity of sending times of the random access information |
|---|---|---|---|
| 1 | Random access preamble set 1 | Frequency domain resource set 1 | 1 |
| 2 | Random access preamble set 2 | Frequency domain resource set 1 | 2 |
| 3 | Random access preamble set 1 | Frequency domain resource set 2 | 3 |
| 4 | Random access preamble set 2 | Frequency domain resource set 2 | 4 |
| 5 | Random access preamble set 1 | Frequency domain resource set 3 | 5 |
| 6 | Random access preamble set 2 | Frequency domain resource set 3 | 6 |
| 7 | Random access preamble set 1 | Frequency domain resource set 4 | 7 |
| 8 | Random access preamble set 2 | Frequency domain resource set 4 | 8 |

Understandably, in the mapping relationship, one quantity of sending times may correspond to a plurality of combinations of a random access preamble set and a frequency domain resource set, or one combination of a random access preamble set and a frequency domain resource set.

For explanations about the random access preamble sets and the description of the frequency domain resource sets, refer to the first manner and the second manner above, details of which are omitted here.

The mapping relationship between the random access preamble set and the frequency domain resource set and the quantity of sending times of the random access information may be preset in the terminal device and the network device, or may be sent by the network device to the terminal device. For example, the network device may send indication information to the terminal device. The indication information is used to indicate the mapping relationship between the random access preamble set and the frequency domain resource set and the quantity of sending times of the random access information. Correspondingly, the terminal device may obtain the indication information from the network device.

For example, the network device may send the indication information to the terminal device by using signaling. The signaling is, for example, any one of the following: RRC signaling, MAC signaling, physical layer signaling, and the like.

In this way, the terminal device may, based on a quantity of sending times of the random access information currently sent by the terminal device, and based on the mapping relationship between the random access preamble set and the frequency domain resource set and the quantity of sending times of the random access information, determine the random access preamble set and the frequency domain resource set corresponding to the quantity of sending times of the currently sent random access information. Subsequently, the terminal device may select a random access preamble from the random access preamble set, select a frequency domain resource from the frequency domain resource set, add the random access preamble into the random access information by using the frequency domain resource, and send the random access information to the network device. In this way, the quantity of sending times of the random access information is jointly indicated by using the set that includes the random access preamble and the set that includes the frequency domain resource used to send the random access information. After sending the random access information, the terminal device may detect the RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated quantity of sending times of the random access information based on the random access preamble in the random access information, the frequency domain resource used to transmit the random access information, and the mapping relationship between the random access preamble set and the frequency domain resource set and the quantity of sending times of the random access information. Subsequently, the network device may perform channel sensing in the RAR window of the length corresponding to the quantity of sending times. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

The foregoing example merely illustrates how to indicate the quantity of sending times of the random access information by using a combination of the random access preamble included in the random access information and the frequency domain resource used to send the random access information. As can be understood by a person skilled in the art, the quantity of sending times of the random access information may be indicated with the random access preamble plus the frequency domain resource by using a combination of any implementation enumerated in the first manner and any implementation enumerated in the second manner, details of which are omitted here.

Fourth manner: The random access information includes a random access preamble and indication information. The indication information is used to indicate the quantity of sending times of the random access information.

In this embodiment, the random access information may carry, in addition to the random access preamble, indication information exclusively used to indicate the quantity of sending times of the random access information so that the quantity of sending times of the random access information is explicitly indicated. For example, the indication information may indicate the quantity of sending times of random access information by using a binary number used to represent a quantity of sending times.

Understandably, this embodiment imposes no limitation on the random access preamble included in the random access information by the terminal device and the frequency domain resource used to transmit the random access information.

The foregoing embodiment describes how to use the random access information to indicate the quantity of sending times of the random access information sent by the terminal device to the network device, so that the quantity of sending times is used to instruct the network device to send the RAR to the terminal device by using an RAR window of a length corresponding to the quantity of sending times. In some embodiments, the random access information may be directly used to indicate the RAR window length corresponding to the quantity of sending times of the random access information. To be specific, the random access information directly indicates the RAR window length to be used by the network device to send the RAR. In specific implementation, the random access information may indicate the corresponding RAR window length in the following manners. Specifically:

First manner: The random access information includes a random access preamble (preamble code). The random access preamble is used to indicate the corresponding random access response window length.

Optionally, the available random access preambles between the terminal device and the network device may be pre-grouped, so that each random access preamble corresponds to one RAR window length, that is, the RAR window length corresponding to one quantity of sending times of the random access information. In other words, there is a mapping relationship between the random access preamble and the corresponding random access response window length. For example, the mapping relationship may be shown in Table 6.

TABLE 6

| Serial number | Random access preamble | RAR window length |
|---|---|---|
| 1 | Random access preamble 1 | Length 1 |
| 2 | Random access preamble 2 | Length 1 |
| 3 | Random access preamble 3 | Length 2 |
| ... | ... | ... |
| n | Random access preamble N | Length M |

Both M and N are positive integers, and M is less than or equal to N. In the mapping relationship, one RAR window length may correspond to a plurality of random access preambles.

Understandably, each RAR window length may correspond to a same quantity of random access preambles, or a different quantity of random access preambles. In specific implementation, the quantity of random access preambles corresponding to each RAR window length may be configured according to an actual use requirement, so that the quantity of random access preambles corresponding to each RAR window length can meet the actual use requirement. For example, the quantity of random access preambles corresponding to each RAR window length may be configured based on the following principle: the larger the value of the quantity of sending times of the random access information corresponding to the RAR window length, the smaller the quantity of the random access preambles corresponding to the RAR window length.

The mapping relationship between the random access preamble and the RAR window length may be preset in the terminal device and the network device, or may be sent by the network device to the terminal device. For example, the network device may send indication information to the terminal device. The indication information is used to indicate the mapping relationship between the random access preamble and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on an RAR window length corresponding to the quantity of sending times of the random access information currently sent by the terminal device, and based on the mapping relationship between the random access preamble and the RAR window length, determine a random access preamble included in the random access information currently to be sent. In addition, the terminal device may send, to the network device, the random access information including the random access preamble, to indicate the RAR window length by using the random access preamble. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the random access preamble in the random access information and the mapping relationship between the random access preamble and the RAR window length. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times. [001%] Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available random access preambles between the terminal device and the network device may be pre-grouped based on preset bits of the random access preambles, so that the random access preambles can represent corresponding RAR windows. For example, random access preambles with a same bit value correspond to one RAR window length, that is, the RAR window length corresponding to one quantity of sending times of the random access information. Random access preambles with different bit values correspond to different RAR window lengths. In other words, there is a mapping relationship between the preset bit of the random access preamble and the RAR window length.

Understandably, each RAR window length may correspond to a same quantity of random access preambles or a different quantity of random access preambles, specifically depending on the quantity of random access preambles corresponding to the bit.

The mapping relationship between the preset bit of the random access preamble and the RAR window length may be preset in the terminal device and the network device, or may be sent by the network device to the terminal device. For example, the network device may send indication information to the terminal device. The indication information is used to indicate the mapping relationship between the preset bit of the random access preamble and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

Optionally, the random access information may further include a random access preamble and additional bit information, so that the random access information including the additional bit information can represent a corresponding RAR window. The additional bit information can implement the same function as the preset bit, or may also be indicated by using signaling in a way similar to how the preset bit is indicated.

In this way, the terminal device may, based on an RAR window length corresponding to the quantity of sending times of the random access information currently sent by the terminal device, and based on the mapping relationship between the preset bit of the random access preamble and the RAR window length, determine a random access preamble corresponding to the RAR window length. In addition, the terminal device may send, to the network device, the random access information including the random access preamble, to indicate the RAR window length by using the random access preamble. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the preset bit of the random access preamble in the random access information and the mapping relationship between the preset bit of the random access preamble and the RAR window length. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available random access preambles between the terminal device and the network device may be further pre-grouped into a plurality of random access preamble sets. The grouping into the preamble sets may be performed based on information such as different root sequences and different cyclic shifts. For example, random access preambles corresponding to the same root sequence may be grouped into the same random access preamble set. Alternatively, random access preambles corresponding to the same cyclic shift quantity may be grouped into the same random access preamble set. Alternatively, random access preambles corresponding to the same root sequence and corresponding to the same cyclic shift quantity may be grouped into the same random access preamble set. Alternatively, some random access preambles are randomly selected and grouped into the same random access preamble set. In some embodiments, the set may also be referred to as a group, a category, a series, a resource pool, a pool, or the like, details of which are omitted here.

Each random access preamble set formed above may correspond to one RAR window length, that is, the RAR window length corresponding to one quantity of sending times of the random access information. In other words, there is a mapping relationship between the random access preamble set and the RAR window length. In an example in which there are 6 random access preamble sets, the mapping relationship may be shown in Table 7.

TABLE 7

| Serial number | Random access preamble set | RAR window length |
|---|---|---|
| 1 | Random access preamble set 1 | Length 1 |
| 2 | Random access preamble set 2 | Length 2 |
| 3 | Random access preamble set 3 | Length 3 |
| 4 | Random access preamble set 4 | Length 4 |
| 5 | Random access preamble set 5 | Length 5 |
| 6 | Random access preamble set 6 | Length 6 |

Understandably, in the mapping relationship in some embodiments, one RAR window length may correspond to a plurality of random access preamble sets or one random access preamble set.

Understandably, each random access preamble set may include a same quantity of random access preambles or a different quantity of random access preambles. In specific implementation, the quantity of random access preambles included in each random access preamble set may be configured according to an actual use requirement, so that the quantity of random access preambles corresponding to each RAR window length can meet the actual use requirement. For example, the quantity of random access preambles included in each random access preamble set may be configured based on the following principle: the larger the value of the quantity of sending times of the random access information corresponding to the RAR window length, the smaller the quantity of random access preambles included in the random access preamble set corresponding to the RAR window length.

The mapping relationship between the random access preamble set and the RAR window length may be preset in the terminal device and the network device, or may be sent by the network device to the terminal device. For example, the network device may send indication information to the terminal device. The indication information is used to indicate the mapping relationship between the random access preamble set and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on an RAR window length currently used by the terminal device to send the random access information and the mapping relationship between the RAR window length and the random access set, determine a random access preamble set corresponding to the RAR window length. Subsequently, the terminal device may select a random access preamble from the set, and send random access information including the random access preamble to the network device, to indicate the RAR window length by using the set that includes the random access preamble. After sending the random access information, the terminal device may detect the RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the random access preamble in the random access information and the mapping relationship between the RAR window length and the random access set. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Second manner: The random access information includes a random access preamble. A frequency domain resource on which the random access preamble is located is used to indicate the RAR window length.

Optionally, the available frequency domain resources used to transmit the random access preambles between the terminal device and the network device may be pre-grouped, so that each frequency domain resource corresponds to one RAR window length, that is, the RAR window length corresponding to one quantity of sending times of the random access information. In other words, there is a mapping relationship between the frequency domain resource used to transmit the random access preamble and the RAR window length. For example, the mapping relationship may be shown in Table 8.

TABLE 8

| Serial number | Frequency domain resource used to transmit a random access preamble | RAR window length |
|---|---|---|
| 1 | Frequency domain resource 1 | Length 1 |
| 2 | Frequency domain resource 2 | Length 1 |
| 3 | Frequency domain resource 3 | Length 2 |
| ... | ... | ... |
| n | Frequency domain resource A | Length B |

Both A and B are positive integers, and B is less than or equal to A. In the mapping relationship, one RAR window length may correspond to a plurality of frequency domain resources.

Understandably, each RAR window length may correspond to a same quantity of frequency domain resources, or a different quantity of frequency domain resources. In specific implementation, the quantity of frequency domain resources corresponding to each RAR window length may be configured according to an actual use requirement, so that the quantity of frequency domain resources corresponding to each RAR window length can meet the actual use requirement. For example, the quantity of frequency domain resources corresponding to each RAR window length may be configured based on the following principle: the larger the value of the quantity of sending times of the random access information corresponding to the RAR window length, the smaller the quantity of the frequency domain resources corresponding to the RAR window length.

The mapping relationship between the frequency domain resource used to transmit the random access preamble and the RAR window length may be preset in the terminal device and the network device, or may be sent by the network device to the terminal device. For example, the network device may send indication information to the terminal device. The indication information is used to indicate the mapping relationship between the frequency domain resource used to transmit the random access preamble and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on the RAR window length corresponding to the quantity of sending times of the random access information currently sent by the terminal device, and based on the mapping relationship between the frequency domain resource used to transmit the random access preamble and the RAR window length, determine a frequency domain resource currently used for sending the random access information to the network device. In addition, the terminal device may send the random access information to the network device by using the frequency domain resource, to indicate the RAR window length by using the frequency domain resource. Subsequently, the terminal device may detect an RAR in an RAR window of a length corresponding to the quantity of sending times. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the frequency domain resource on which the random access information is located and the mapping relationship between the frequency domain resource used to transmit the random access preamble and the RAR window length. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Optionally, the available frequency domain resources used to transmit the random access preambles between the terminal device and the network device may be further pre-grouped into a plurality of frequency domain resource sets. Frequency domain resources included in a same frequency domain resource set may be consecutive frequency domain resources, or may be inconsecutive frequency domain resources. In some embodiments, the set may also be referred to as a group, a category, a series, a resource pool, a pool, or the like, details of which are omitted here.

Each frequency domain resource set formed above may correspond to one RAR window length, that is, the RAR window length corresponding to one quantity of sending times of the random access information. In other words, there is a mapping relationship between the frequency domain resource set and the RAR window length. In an example in which there are 4 frequency domain resource sets, the mapping relationship may be shown in Table 9.

TABLE 9

| Serial number | Frequency domain resource set | RAR window length |
|---|---|---|
| 1 | Frequency domain resource set 1 | Length 1 |
| 2 | Frequency domain resource set 2 | Length 2 |
| 3 | Frequency domain resource set 3 | Length 3 |
| 4 | Frequency domain resource set 4 | Length 4 |

Understandably, in the mapping relationship, one RAR window length may correspond to a plurality of frequency domain resource sets or one frequency domain resource set.

Understandably, each frequency domain resource set may include a same quantity of frequency domain resources or a different quantity of frequency domain resources. In specific implementation, the quantity of random access preambles included in each frequency domain resource set may be configured according to an actual use requirement, so that the quantity of frequency domain resources corresponding to each RAR window length can meet the actual use requirement. For example, the quantity of frequency domain resources included in each frequency domain resource set may be configured based on the following principle: the larger the value of the quantity of sending times of the random access information corresponding to the RAR window length, the smaller the quantity of the frequency domain resources included in the frequency domain resource set corresponding to the RAR window length.

The mapping relationship between the frequency domain resource set and the RAR window length may be preset in the terminal device and the network device, or may be sent by the network device to the terminal device. For example, the network device may send indication information to the terminal device. The indication information is used to indicate the mapping relationship between the frequency domain resource set and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on an RAR window length corresponding to the quantity of sending times of the random access information currently sent by the terminal device, and based on the mapping relationship between the frequency domain resource set and the RAR window length, determine a frequency domain resource set corresponding to the RAR window length. Subsequently, the terminal device may select a frequency domain resource from the set, and send the random access information to the network device by using the frequency domain resource, to indicate the RAR window length by using the frequency domain resource set that includes the frequency domain resource used to transmit the random access information. After sending the random access information, the terminal device may detect the RAR in an RAR window of such length. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the frequency domain resource used to transmit the random access information, and based on the mapping relationship between the frequency domain resource set and the RAR window length. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

Third manner: The random access information includes a random access preamble. The random access preamble and a frequency domain resource on which the random access preamble is located are used to indicate the RAR window length. In other words, the random access preamble and the frequency domain resource on which the random access preamble is located are used together to indicate the RAR window length. In this manner, limited random access preambles and limited frequency domain resources can be used to indicate more RAR window lengths.

Optionally, the available random access preambles between the terminal device and the network device may be pre-grouped, and the available frequency domain resources used to transmit the random access preambles between the terminal device and the network device may be pre-grouped, so that the random access information including a same random access preamble is used to indicate different corresponding RAR window lengths when being sent by using different frequency domain resources. For example, when the random access information including a random access preamble A is sent by using a frequency domain resource 1, the random access information is used to indicate that the corresponding RAR window length is 20 ms. When the random access information including the random access preamble A is sent by using a frequency domain resource 2, the random access information is used to indicate that the corresponding RAR window length is 40 ms, and so on.

For details of how to group the random access preambles and the frequency domain resources used to transmit the random access preambles, refer to descriptions in the first manner and the second manner above. In the example described below, the available random access preambles between the terminal device and the network device are pre-grouped into a plurality of random access preamble sets, and the available frequency domain resources used to transmit the random access preambles between the terminal device and the network device are pre-grouped into a plurality of frequency domain resource sets. Specifically:

The available random access preambles between the terminal device and the network device may be grouped into a plurality of random access preamble sets. For example, random access preambles corresponding to the same root sequence may be grouped into the same random access preamble set. Alternatively, random access preambles corresponding to the same cyclic shift quantity may be grouped into the same random access preamble set. Alternatively, random access preambles corresponding to the same root sequence and corresponding to the same cyclic shift quantity may be grouped into the same random access preamble set. Alternatively, some random access preambles are randomly selected and grouped into the same random access preamble set.

Correspondingly, the available frequency domain resources used to transmit the random access preambles between the terminal device and the network device may be grouped into a plurality of frequency domain resource sets. Frequency domain resources included in a same frequency domain resource set may be consecutive frequency domain resources, or may be inconsecutive frequency domain resources.

In some embodiments, the set may also be referred to as a group, a category, a series, a resource pool, a pool, or the like, details of which are omitted here.

Each combination of the random access preamble sets and the frequency domain resource sets formed above may correspond to one RAR window length, that is, the RAR window length corresponding to one quantity of sending times of the random access information. In other words, there is a mapping relationship between the random access preamble set and the frequency domain resource set and the RAR window length. In an example in which there are 4 frequency domain resource sets and 2 random access preamble sets, the mapping relationship may be shown in Table 10.

TABLE 10

| Serial number | Random access preamble set | Frequency domain resource set | RAR window length |
|---|---|---|---|
| 1 | Random access preamble set 1 | Frequency domain resource set 1 | Length 1 |
| 2 | Random access preamble set 2 | Frequency domain resource set 1 | Length 2 |
| 3 | Random access preamble set 1 | Frequency domain resource set 2 | Length 3 |
| 4 | Random access preamble set 2 | Frequency domain resource set 2 | Length 4 |
| 5 | Random access preamble set 1 | Frequency domain resource set 3 | Length 5 |
| 6 | Random access preamble set 2 | Frequency domain resource set 3 | Length 6 |
| 7 | Random access preamble set 1 | Frequency domain resource set 4 | Length 7 |
| 8 | Random access preamble set 2 | Frequency domain resource set 4 | Length 8 |

Understandably, in the mapping relationship, one RAR window length may correspond to a plurality of combinations of a random access preamble set and a frequency domain resource set, or one combination of a random access preamble set and a frequency domain resource set.

For explanations about the random access preamble sets and the description of the frequency domain resource sets, refer to the first manner and the second manner above, details of which are omitted here.

The mapping relationship between the random access preamble set and the frequency domain resource set and the RAR window length may be preset in the terminal device and the network device, or may be sent by the network device to the terminal device. For example, the network device may send indication information to the terminal device. The indication information is used to indicate the mapping relationship between the random access preamble set and the frequency domain resource set and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on an RAR window length corresponding to the quantity of sending times of the random access information currently sent by the terminal device, and based on the mapping relationship between the random access preamble set and the frequency domain resource set and the RAR window length, determine a random access preamble set and a frequency domain resource set corresponding to the RAR window length. Subsequently, the terminal device may select a random access preamble from the random access preamble set, select a frequency domain resource from the frequency domain resource set, add the random access preamble into the random access information by using the frequency domain resource, and send the random access information to the network device. In this way, the RAR window length is indicated by using the set that includes the random access preamble and the set that includes the frequency domain resource used to send the random access information. After sending the random access information, the terminal device may detect the RAR in an RAR window of such length. The terminal device may start, after a second offset configured by the network device, the RAR window of the length corresponding to the quantity of sending times. The second offset is different from a first offset configured for starting the RAR window in a licensed spectrum.

Correspondingly, if the network device successfully receives the random access information sent by the terminal device, the network device determines the indicated RAR window length based on the random access preamble in the random access information, the frequency domain resource used to transmit the random access information, and the mapping relationship between the random access preamble set and the frequency domain resource set and the RAR window length. Subsequently, the network device may perform channel sensing in the RAR window of such length. If the network device successfully senses the channel in the RAR window, the network device may send an RAR to the terminal device. If the network device fails in performing the channel sensing in the RAR window, the network device skips sending the RAR to the terminal device in the RAR window. A time point at which the network device starts the RAR window of the length corresponding to the quantity of sending times is also a time point of receiving the random access preamble sent by the terminal device, and is the same as a time point at which the terminal device starts the RAR window of the length corresponding to the quantity of sending times.

Similarly, if the terminal device detects no RAR in the RAR window, the terminal device may increase the quantity of sending times of the random access information by one, and perform the foregoing operations again. For a cause of detecting no RAR by the terminal device, refer to the foregoing description.

The foregoing example merely illustrates how to indicate the RAR window length by using a combination of the random access preamble included in the random access information and the frequency domain resource used to send the random access information. As can be understood by a person skilled in the art, the RAR window length may be indicated with the random access preamble plus the frequency domain resource by using a combination of any implementation enumerated in the first manner and any implementation enumerated in the second manner, details of which are omitted here.

Fourth manner: The random access information includes a random access preamble and indication information. The indication information is used to indicate the corresponding random access response window length.

In this embodiment, the random access information may carry, in addition to the random access preamble, indication information exclusively used to indicate a corresponding random access response window length so that the corresponding random access response window length is explicitly indicated. For example, the indication information may indicate the corresponding random access response window length by using a binary number used to represent the corresponding random access response window length.

Understandably, this embodiment imposes no limitation on the random access preamble included in the random access information by the terminal device and the frequency domain resource used to transmit the random access information.

As described in the foregoing embodiment, each different quantity of sending times of the random access information corresponds to a different RAR window length. For example, the larger the value of the quantity of sending times, the smaller the RAR window length; or, the larger the value of the quantity of sending times, the larger the RAR window length.

In some embodiments, the RAR window length may be set to increase with the rise of the value of the quantity of sending times of the random access information. In other words, the larger the value of the quantity of sending times, the larger the RAR window length. For example, an RAR window length corresponding to a quantity of sending times 2 is larger than an RAR window length corresponding to a quantity of sending times 1, an RAR window length corresponding to a quantity of sending times 3 is larger than the RAR window length corresponding to the quantity of sending times 2, and so on.

Figure 4:
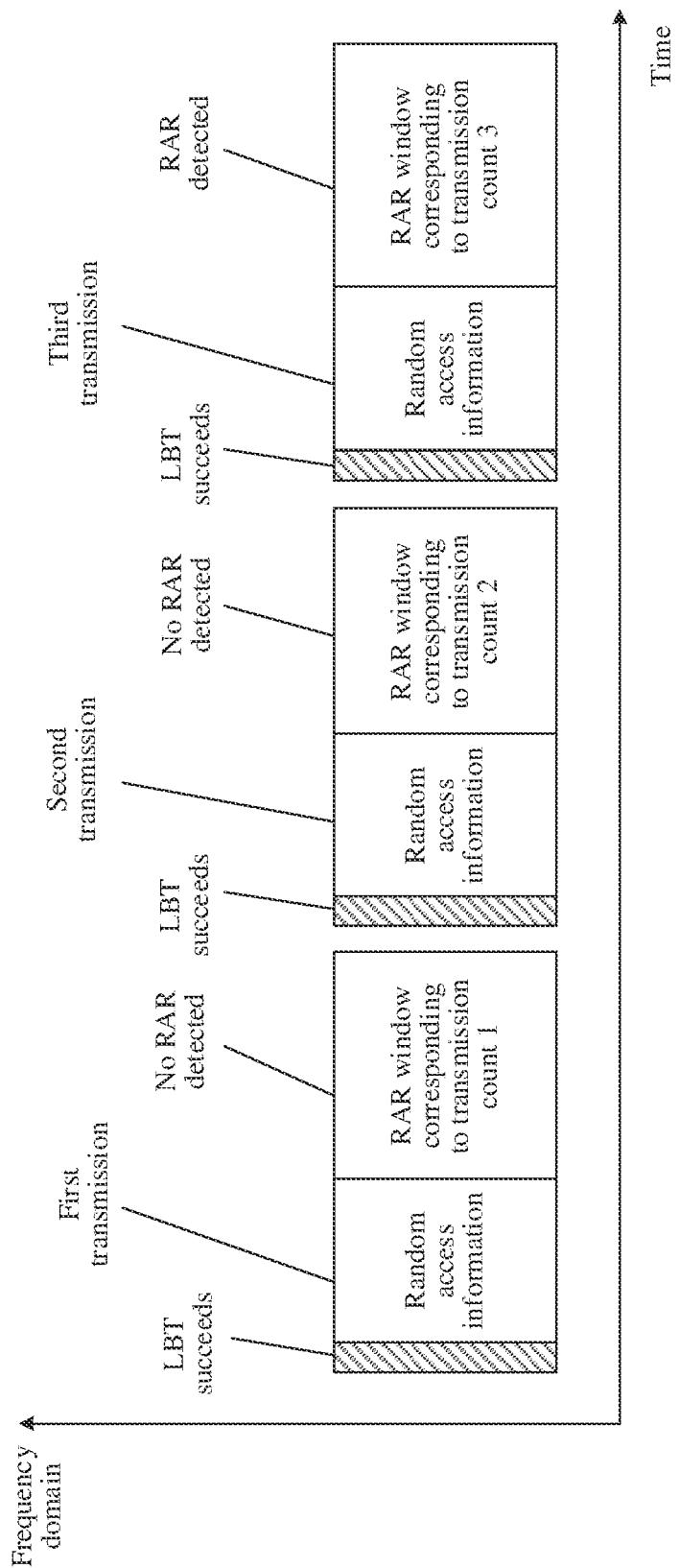
FIG. 4 is a schematic diagram of a time-frequency resource according to an embodiment of this application.

For example, FIG. 4 is a schematic diagram of a time-frequency resource according to an embodiment of this application. As shown in FIG. 4, during implementation of a random access process, a terminal device may send random access information to a network device for a first time after an LBT succeeds. At this time, a quantity of sending times of the random access information is 1. Subsequently, the terminal device may detect an RAR in an RAR window of a length corresponding to the quantity of sending times 1. If the terminal device fails in receiving the RAR in the RAR window corresponding to the quantity of sending times 1, the terminal device continues to perform an LBT after the RAR window corresponding to the quantity of sending times 1 ends. After the LBT succeeds, the terminal device sends the random access information to the network device for a second time. At this time, the quantity of sending times of the random access information is 2. Subsequently, the terminal device may detect the RAR in an RAR window corresponding to the quantity of sending times 2. In this scenario, the RAR window length corresponding to the quantity of sending times 2 is larger than the RAR window length corresponding to the quantity of sending times 1. If the terminal device fails in receiving the RAR in the RAR window corresponding to the quantity of sending times 2, the terminal device continues to perform an LBT after the RAR window corresponding to the quantity of sending times 2 ends. After the LBT succeeds, the terminal device sends the random access information to the network device for a third time. At this time, the quantity of sending times of the random access information is 3. Subsequently, the terminal device may detect the RAR in an RAR window corresponding to the quantity of sending times 3. In this scenario, the RAR window length corresponding to the quantity of sending times 3 is larger than the RAR window length corresponding to the quantity of sending times 2. In this example, the terminal device successfully detects, in the RAR window corresponding to the quantity of sending times 3, the RAR sent by the network device.

In this manner, when the terminal device fails in receiving the RAR sent by the network device, the RAR window length corresponding to the random access information sent each time may be gradually increased. In this way, the network device can obtain more time opportunities gradually to perform LBT, thereby improving a transmission success rate of the RAR and shortening a random access delay of the terminal device.

Understandably, a random access response window length corresponding to the random access information sent for a first time may be referred to as a first random access response window length, or referred to as an initial random access response window length, a random access response window length corresponding to the random access information sent for a second time may be referred to as a second random access response window length, a random access response window length corresponding to the random access information sent for a third time may be referred to as a third random access response window length, and so on.

When the mapping relationship between the quantity of sending times of the random access information and the RAR window length is configured based on a principle in which the RAR window length increases with the rise of the value of the quantity of sending times, the mapping may be: a $Q^{th}$ RAR window length is m times a $(Q-1)^{th}$ RAR window length, or a $Q^{th}$ RAR window length differs from a $(Q-1)^{th}$ RAR window length by a preset threshold.

When the mapping is that the $Q^{th}$ RAR window length is m times the $(Q-1)^{th}$ RAR window length, or the RAR window length may increase exponentially. For example, if m is equal to 2, the $Q^{th}$ RAR window length L(RAR window)$_Q$ may be expressed by the following Formula (1):

$$L(\text{RAR window})_Q = 2^{Q-1} \times X \quad (1)$$

X represents the first random access response window length. As can be learned from Formula (1), the first RAR window length is X, the second RAR window length is 2X, the third RAR window length is 3X, and so on. Therefore, the RAR window length becomes a variable value that varies with the quantity of sending times of the random access information.

When the mapping is that the $Q^{th}$ RAR window length differs from the $(Q-1)^{th}$ RAR window length by a preset threshold, a delta offset (that is, a preset threshold) may be preset, so that the $Q^1$ RAR window length is larger than the $(Q-1)^{th}$ RAR window length by delta. In this implementation, the $Q^{th}$ RAR window length may be expressed by the following Formula (2):

$$L(\text{RAR window})_Q = X + (Q-1) \times \text{delta} \quad (2)$$

As can be learned from Formula (2), the first RAR window length is X, the second RAR window length is X+delta, the third RAR window length is X+2delta, and so on.

As can be learned from the description above, each quantity of sending times of the random access information corresponds to one RAR window length. In other words, there is a mapping relationship between the quantity of sending times of the random access information and the RAR window length. The mapping relationship may be a mapping relationship shown in Table 11.

TABLE 11

| Serial number | Quantity of sending times of the random access information | RAR window length |
| --- | --- | --- |
| 1 | 1 | Length 1 |
| 2 | 2 | Length 2 |
| 3 | 3 | Length 3 |
| ... | ... | ... |
| n | N | Length N |

Understandably, in the foregoing mapping relationship, a plurality of quantity of sending times may correspond to one RAR window length, or one quantity of sending times may correspond to one RAR window length.

The mapping relationship between the quantity of sending times of the random access information and the RAR window length may also be a function relationship between the quantity of sending times of the random access information and the RAR window length, for example, Formula (1) or Formula (2).

The mapping relationship between the quantity of sending times of the random access information and the RAR window length may be preset in the terminal device and the network device, or may be sent by the network device to the terminal device. For example, the network device may send indication information to the terminal device. The indication information is used to indicate the mapping relationship between the quantity of sending times of the random access information and the RAR window length. Correspondingly, the terminal device may obtain the indication information from the network device. For example, the network device may send the indication information to the terminal device by using signaling. The signaling is, for example, any one of the following: RRC signaling, MAC signaling, physical layer signaling, and the like.

In this way, the terminal device may, based on the quantity of sending times of the random access information currently sent by the terminal device, and based on the mapping relationship between the quantity of sending times of the random access information and the RAR window length, determine an RAR window length corresponding to the quantity of sending times of the currently sent random access information. Therefore, the terminal device can use the RAR window of such length to detect the RAR sent by the network device. Correspondingly, the network device may, based on the quantity of sending times of the random access information indicated in the received random access information, and based on the mapping relationship between the quantity of sending times of the random access information and the RAR window length, determine an RAR window length corresponding to the quantity of sending times of the currently sent random access information. Therefore, the network device can send the RAR to the terminal device by using the RAR window of such length.

It needs to be noted that, when the terminal device directly uses the random access information to indicate the RAR window length corresponding to the random access information to implement the foregoing method embodiment, the terminal device and the network device can still obtain, based on the mapping relationship between the quantity of sending times of the random access information and the RAR window length, the RAR window length corresponding to the quantity of sending times of the currently sent random access information. In some embodiments, the terminal device may directly obtain, based on the mapping relationship between the random access information and the RAR window length, the RAR window length corresponding to the random access information. In other words, the random access information corresponding to different quantity of sending times corresponds to RAR window lengths. In this way, the terminal device or the network device may, based on the random access information in use and the mapping relationship, directly obtain the RAR window length that needs to be used. The implementation is similar, details of which are omitted here.

Understandably, when the terminal device successfully detects, in an RAR window corresponding to the random access information for a specific time, an RAR sent by the network device, the terminal device may reset the quantity of sending times of the random access information and/or reset the random access response window length. To be specific, the quantity of sending times of the random access information is set to 1, and/or the RAR window length is set to the first RAR window length. Correspondingly, when the network device successfully sends an RAR in a RAR window corresponding to the random access information sent for a specific time, the network device may also reset the quantity of sending times of the random access information, and/or reset the random access response window length. To be specific, the quantity of sending times of the random access information is set to 1, and/or the RAR window length is set to the first RAR window length.

It needs to be noted that the first random access response window length may be equal to an RAR window length configured in a communications system operating in a licensed spectrum, or may be different from the RAR window length configured in the communications system operating in the licensed spectrum. The first random access response window length may be preset in the terminal device, or may be sent by the network device to the terminal device by using indication information. This is not limited.

In addition, when an unlicensed spectrum is operated in a high-frequency system, whenever beam switching occurs, the network device and the terminal device may reset the RAR window to the first RAR window length, and select an RAR window of a corresponding length based on the quantity of sending times of the random access information on a current beam, to implement beam-specific setting of the RAR window.

With the random access method provided in this embodiment of this application, when the terminal device needs to send the random access information repeatedly to successfully receive the RAR returned by the network device, the terminal device may, by using the random access information sent to the network device, indicate the quantity of sending times of the random access information sent by the terminal device to the network device, or indicate the RAR window length corresponding to the random access information. Each different quantity of sending times of the random access information may correspond to a different RAR window length. In this way, when the quantity of sending times of the random access information sent by the terminal device is different, the network device may send the RAR to the terminal device by using the RAR window of a different length. In this manner, the RAR window length flexibly varies with the quantity of sending times of the random access information to meet requirements of different unlicensed spectrum systems.

Figure 5:
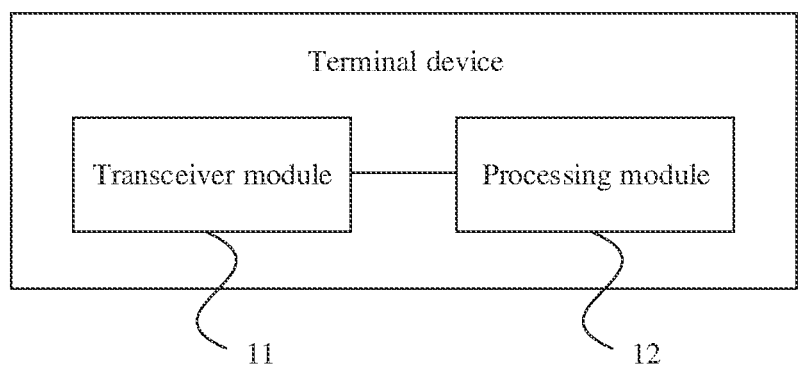
FIG. 5 is a schematic structural diagram of a terminal device according to an embodiment of this application.

FIG. 5 is a schematic structural diagram of a terminal device according to an embodiment of this application. As shown in FIG. 5, the terminal device may include a transceiver module 11 and a processing module 12.

The transceiver module 11 is configured to send random access information to a network device, where the random access information is used to indicate a quantity of sending times of the random access information sent by the terminal device to the network device, or the random access information is used to indicate a random access response window length corresponding to the random access information, and the random access response window length is configurable. For example, the transceiver module 11 is specifically configured to send the random access information to the network device after channel sensing succeeds.

The processing module 12 is configured to perform detection of a random access response in a random access response window by using the transceiver module 11.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the transceiver module 11 may be further configured to obtain first indication information from the network device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the transceiver module 11 may be further configured to obtain third indication information from the network device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the transceiver module 11 may be further configured to obtain fifth indication information from the network device. The fifth indication information is used to indicate a mapping relationship between the quantity of sending times of the random access information, the random access preamble set, and the frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information.

The random access information may, in the following manners, indicate the random access response window length corresponding to the random access information:

First manner: The random access information includes a random access preamble. The random access preamble is used to indicate the random access response window length. In this manner, the transceiver module 11 may be further configured to obtain second indication information from the network device. The second indication information is used to indicate a correspondence between the random access response window length and the random access preamble set. The random access preamble set includes the random access preamble.

Second manner: The random access information includes a random access preamble. A frequency domain resource on which the random access preamble is located is used to indicate the random access response window length. In this manner, the transceiver module 11 may be further configured to obtain fourth indication information from the network device. The fourth indication information is used to indicate a correspondence between the random access response window length and the frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the transceiver module 11 may be further configured to obtain sixth indication information from the network device. The sixth indication information is used to indicate a correspondence between the random access response window length, the random access preamble set, and the frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

Optionally, the processing module 12 may be further configured to determine the random access response window length.

For example, when the random access information is used to indicate the quantity of sending times of the random access information sent by the terminal device to the network device, the processing module 12 is specifically configured to determine the random access response window length based on the quantity of sending times of the random access information and a mapping relationship between the quantity of sending times of the random access information and the random access response window length. Therefore, in this manner, the transceiver module 11 may be further configured to obtain eighth indication information from the network device. The eighth indication information is used to indicate the mapping relationship between the quantity of sending times of the random access information and the random access response window length.

For another example, when the random access information is used to indicate the random access response window length corresponding to the random access information, the processing module 12 is specifically configured to determine the random access response window length based on the random access information and a mapping relationship between the random access information and the random access response window length. Therefore, in this manner, the transceiver module 11 may be further configured to obtain ninth indication information from the network device. The ninth indication information is used to indicate the mapping relationship between the random access information and the random access response window length.

Understandably, the random access response window length differs, by a preset threshold, from a random access response window length corresponding to previously sent random access information. Alternatively, the random access response window length is m times the random access response window length corresponding to the previously sent random access information, where m is a number greater than 1.

Optionally, the transceiver module 11 may be further configured to obtain a first random access response window length from the network device. The first random access response window length is different from a random access response window length in a preset spectrum.

Optionally, the processing module 12 may be further configured to reset, when the random access response is successfully detected in the random access response window, the quantity of sending times of the random access information, and/or reset the random access response window length.

The terminal device provided in the embodiments of this application may execute the foregoing method embodiment, and an implementation principle and technical effect are similar, which is not repeatedly described herein.

Figure 6:
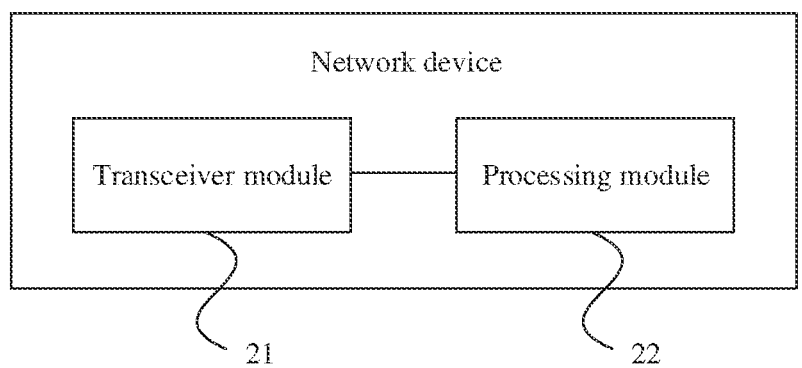
FIG. 6 is a schematic structural diagram of a network device according to an embodiment of this application.

FIG. 6 is a schematic structural diagram of a network device according to an embodiment of this application. As shown in FIG. 6, the network device may include a transceiver module 21 and a processing module 22.

The transceiver module 21 is configured to receive random access information from a terminal device, where the random access information is used to indicate a quantity of sending times of the random access information sent by the terminal device to the network device, or the random access information is used to indicate a random access response window length corresponding to the access information, and the random access response window length is configurable.

The processing module 22 is configured to send, when channel sensing is performed successfully in a random access response window, a random access response to the terminal device by using the transceiver module 21.

The random access information may, in the following manners, indicate the quantity of sending times of the random access information sent by the terminal device to the network device:

First manner: The random access information includes a random access preamble. The random access preamble is used to indicate the quantity of sending times of the random access information. In this manner, the transceiver module 21 may be further configured to send first indication information to the terminal device. The first indication information is used to indicate a mapping relationship between the quantity of sending times of the random access information and a random access preamble set. The random access preamble set includes the random access preamble.

Second manner: The random access information includes a random access preamble. A frequency domain resource on which the random access preamble is located is used to indicate the quantity of sending times of the random access information. In this manner, the transceiver module 21 may be further configured to send third indication information to the terminal device. The third indication information is used to indicate a mapping relationship between the quantity of sending times of the random access information and a frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the quantity of sending times of the random access information. In this manner, the transceiver module 21 may be further configured to send fifth indication information to the terminal device. The fifth indication information is used to indicate a mapping relationship between the quantity of sending times of the random access information, the random access preamble set, and the frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the quantity of sending times of the random access information, or the seventh indication information is used to indicate the random access response window length.

The random access information may, in the following manners, indicate the random access response window length corresponding to the random access information:

First manner: The random access information includes a random access preamble. The random access preamble is used to indicate the random access response window length. In this manner, the transceiver module 21 may be further configured to send second indication information to the terminal device. The second indication information is used to indicate a correspondence between the random access response window length and the random access preamble set. The random access preamble set includes the random access preamble.

Second manner: The random access information includes a random access preamble. A frequency domain resource on which the random access preamble is located is used to indicate the random access response window length. In this manner, the transceiver module 21 may be further configured to send fourth indication information to the terminal device. The fourth indication information is used to indicate a correspondence between the random access response window length and the frequency domain resource set. The frequency domain resource set includes the frequency domain resource on which the random access preamble is located.

Third manner: The random access information includes a random access preamble. The random access preamble and a frequency domain resource on which the random access preamble is located are used to indicate the random access response window length. In this manner, the transceiver module 21 may be further configured to send sixth indication information to the terminal device. The sixth indication information is used to indicate a correspondence between the random access response window length, the random access preamble set, and the frequency domain resource set. The random access preamble set includes the random access preamble, and the frequency domain resource set includes the frequency domain resource on which the random access preamble is located.

Fourth manner: The random access information includes a random access preamble and seventh indication information. The seventh indication information is used to indicate the random access response window length.

Optionally, the processing module 22 may be further configured to determine the random access response window length.

For example, when the random access information is used to indicate the quantity of sending times of the random access information sent by the terminal device to the network device, the processing module 22 is specifically configured to determine the random access response window length based on the quantity of sending times of the random access information and a mapping relationship between the quantity of sending times of the random access information and the random access response window length. In this manner, the transceiver module 21 may be further configured to send eighth indication information to the terminal device. The eighth indication information is used to indicate the mapping relationship between the quantity of sending times of the random access information and the random access response window length.

For another example, when the random access information is used to indicate the random access response window length corresponding to the random access information, the processing module 22 is specifically configured to determine the random access response window length based on the random access information and a mapping relationship between the random access information and the random access response window length. In this manner, the transceiver module 21 may be further configured to send ninth indication information to the terminal device. The ninth indication information is used to indicate the mapping relationship between the random access information and the random access response window length.

Understandably, the random access response window length differs, by a preset threshold, from a random access response window length corresponding to previously sent random access information. Alternatively, the random access response window length is m times the random access response window length corresponding to the previously sent random access information, where m is a number greater than 1.

Optionally, the transceiver module 21 may be further configured to send a first random access response window length to the terminal device. The first random access response window length is different from a random access response window length in a preset spectrum.

Optionally, the processing module 22 may be further configured to reset, when the random access response is successfully sent to the terminal device in the random access response window by using the transceiver module 21, the quantity of sending times of the random access information, and/or reset the random access response window length.

The network device provided in this embodiment of this application may execute the foregoing method embodiment, and an implementation principle and technical effect are similar, which is not repeatedly described herein.

Understandably, in actual implementation, the transceiver module may be a transceiver, and the transceiver module may further include a transmitter and a receiver. The processing module may be implemented in a form of software invoked by a processing element, or implemented in a form of hardware. For example, the processing module may be an independently disposed processing element, or may be integrated in a chip of the foregoing device. In addition, the processing module may be stored in a memory of the foregoing device in a form of program code, and a processing element of the foregoing device invokes and executes a function of the foregoing processing module. In addition, all or some of the modules may be integrated together, or may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application specific integrated circuits (ASIC), or one or more microprocessors (or digital signal processor, DSP), or one or more field programmable gate arrays (FPGA), or the like. For another example, when a module described above is implemented in a form of a processing element scheduling program code, the processing element may be a general-purpose processor, for example, a central processing unit (CPU) or another processor that can invoke program code. For another example, such modules may be integrated together and implemented in a form of a system-on-a-chip (SOC).

Figure 7:
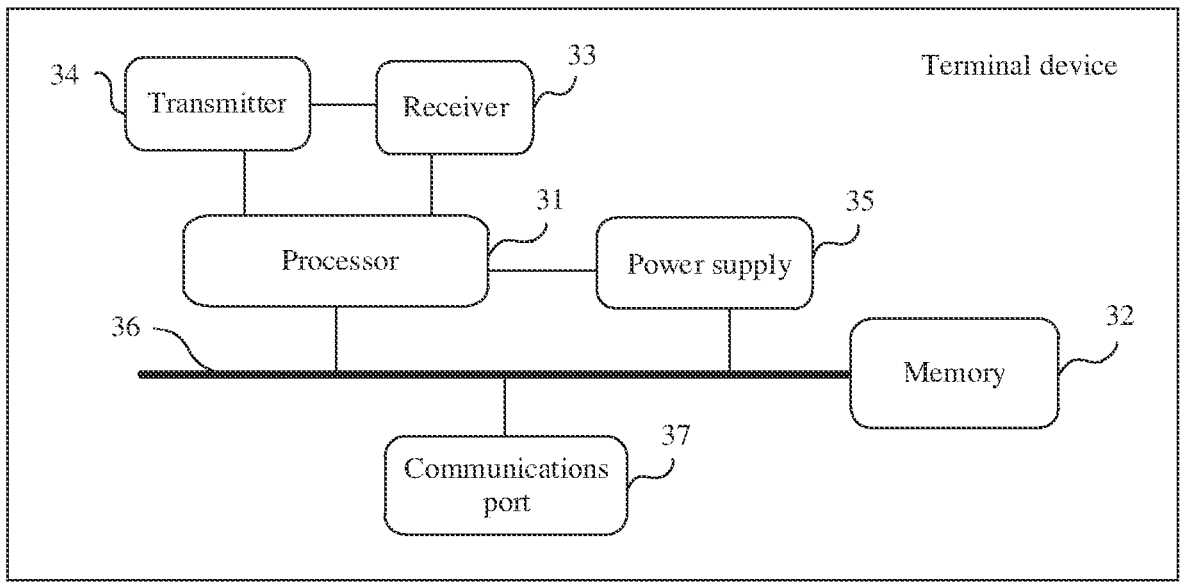
FIG. 7 is a schematic structural diagram of another terminal device according to an embodiment of this application.

FIG. 7 is a schematic structural diagram of another terminal device according to an embodiment of this application. As shown in FIG. 7, the terminal device may include a processor 31 (for example, a CPU), a memory 32, a receiver 33, and a transmitter 34. Both the receiver 33 and the transmitter 34 are coupled to the processor 31, the processor 31 controls a receiving action of the receiver 33, and the processor 31 controls a sending action of the transmitter 34. The memory 32 may include a high-speed random access memory (RAM), or may further include a non-volatile memory (NVM), for example, at least one magnetic disk memory. The memory 32 may store various instructions to complete various processing functions and implement method steps in this application. Optionally, the terminal device in this application may further include a power supply 35, a communications bus 36, and a communications port 37. The receiver 33 and the transmitter 34 may be integrated in a transceiver of the terminal device, or may be independent transceiver antennas on the terminal device. The communications bus is 36 configured to implement a communication connection between components. The communications port 37 is configured to implement connection and communication between the terminal device and another peripheral.

In this embodiment of this application, the memory 32 is configured to store computer-executable program code, and the program code includes an instruction. When the processor 31 executes the instruction, the instruction causes the processor 31 of the terminal device to perform the processing action of the terminal device in the foregoing method embodiments, causes the receiver 33 to perform the receiving action of the terminal device in the foregoing method embodiments, and causes the transmitter 34 to perform the sending action of the terminal device in the foregoing method embodiments. Implementation principles and technical effects thereof are similar, and details are omitted here.

Figure 8:
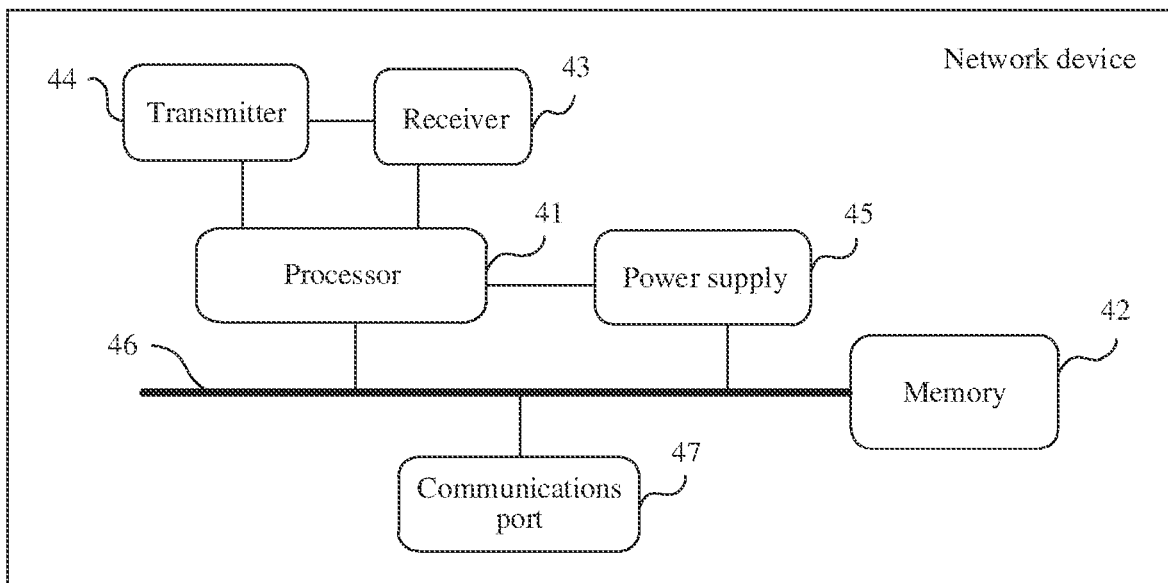
FIG. 8 is a schematic structural diagram of another network device according to an embodiment of this application.

FIG. 8 is a schematic structural diagram of another network device according to an embodiment of this application. As shown in FIG. 8, the network device may include a processor 41 (for example, a CPU), a memory 42, a receiver 43, and a transmitter 44. Both the receiver 43 and the transmitter 44 are coupled to the processor 41. The processor 41 controls a receiving action of the receiver 43, and the processor 41 controls a sending action of the transmitter 44. The memory 42 may include a high-speed RAM memory, or may further include a non-volatile memory NVM, for example, at least one magnetic disk memory. The memory 42 may store various instructions to complete various processing functions and implement method steps in this application. Optionally, the network device in this application may further include a power supply 45, a communications bus 46, and a communications port 47. The receiver 43 and the transmitter 44 may be integrated in a transceiver of the network device, or may be independent transceiver antennas on the network device. The communications bus is 46 configured to implement a communication connection between components. The communications port 47 is configured to implement connection and communication between the network device and another peripheral.

In this application, the memory 42 is configured to store computer-executable program code, and the program code includes an instruction. When the processor 41 executes the instruction, the instruction causes the processor 41 of the network device to perform the processing action of the network device in the foregoing method embodiments, causes the receiver 43 to perform the receiving action of the network device in the foregoing method embodiments, and causes the transmitter 44 to perform the sending action of the network device in the foregoing method embodiments. Implementation principles and technical effects thereof are similar, and details are omitted here.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

The term "a plurality of" in this application refers to at least two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates that there is an "or" relationship between the associated objects. In a formula, the character "/" indicates that the relationship between the associated objects is "division".

Understandably, various reference numerals in the embodiments of this application are merely for differentiation for ease of description, and are not intended to limit the scope of the embodiments of this application.

It should be understood that sequence numbers of the foregoing processes do not mean execution sequences in the embodiments of this application. The execution sequences of the processes shall be determined according to functions and internal logic of the processes, and shall not be construed as any limitation on the implementation processes of the embodiments of this application.

What is claimed is:

1. A random access method comprising:
    sending, by a terminal device, random access information to a network device, wherein the random access information is used to indicate a quantity of sending times of the random access information sent by the terminal device to the network device; or the random access information is used to indicate a random access response window length corresponding to the random access information, and the random access response window length is configurable; and
    detecting, by the terminal device, a random access response in a random access response window;
    wherein the random access response window length differs, by a preset threshold, from another random access response window length corresponding to previously sent random access information; or
    the random access response window length is m times the another random access response window length corresponding to the previously sent random access information, wherein m is a number greater than 1.

2. The method according to claim 1, wherein the random access information comprises a random access preamble; and the random access preamble is used to indicate the quantity of sending times of the random access information, or the random access preamble is used to indicate the random access response window length.

3. The method according to claim 2, wherein the method further comprises:
    obtaining, by the terminal device, first indication information from the network device, wherein the first indication information is used to indicate a mapping relationship between the quantity of sending times of the random access information and a first random access preamble set, and the first random access preamble set comprises the random access preamble; or
    obtaining, by the terminal device, second indication information from the network device, wherein the second indication information is used to indicate a correspondence between the random access response window length and a second random access preamble set, and the second random access preamble set comprises the random access preamble.

4. The method according to claim 1, wherein the random access information comprises a random access preamble; and a frequency domain resource on which the random access preamble is located is used to indicate the quantity of sending times of the random access information, or another frequency domain resource on which the random access preamble is located is used to indicate the random access response window length.

5. The method according to claim 4, wherein the method further comprises:
    obtaining, by the terminal device, indication information from the network device, wherein the indication information is used to indicate a mapping relationship between the quantity of sending times of the random access information and a frequency domain resource set, and the frequency domain resource set comprises the frequency domain resource on which the random access preamble is located; or
    obtaining, by the terminal device, other indication information from the network device, wherein the other indication information is used to indicate a correspondence between the random access response window length and another frequency domain resource set, and the another frequency domain resource set comprises the frequency domain resource on which the random access preamble is located.

6. The method according to claim 1, wherein the method further comprises:
    obtaining, by the terminal device, a first random access response window length from the network device, wherein the first random access response window length is different from another random access response window length in a preset spectrum.

7. The method according to claim 1, wherein the random access response window length increases, by the preset threshold, from the another random access response window length corresponding to the previously sent random access information.

8. A random access method comprising:
    receiving, by a network device, random access information from a terminal device, wherein the random access information is used to indicate a quantity of sending times of the random access information sent by the terminal device to the network device; or the random access information is used to indicate a random access response window length corresponding to the random access information, and the random access response window length is configurable; and
    if the network device successfully performs channel monitoring in a random access response window, sending, by the network device, a random access response to the terminal device;
    wherein the random access response window length differs, by a preset threshold, from another random access response window length corresponding to previously sent random access information; or
    the random access response window length is m times the another random access response window length corresponding to the preciously sent random access information, wherein m is a number greater than 1.

9. The method according to claim 8, wherein the random access information comprises a random access preamble; and the random access preamble is used to indicate the quantity of sending times of the random access information, or the random access preamble is used to indicate the random access response window length.

10. The method according to claim 9, wherein the method further comprises:
    sending, by the network device, first indication information to the terminal device, wherein the first indication information is used to indicate a mapping relationship between the quantity of sending times of the random access information and a first random access preamble set, and the first random access preamble set comprises the random access preamble; or
    sending, by the network device, second indication information to the terminal device, wherein the second indication information is used to indicate a correspondence between the random access response window length and a second random access preamble set, and the second random access preamble set comprises the random access preamble.

11. The method according to claim 8, wherein the random access information comprises a random access preamble; and a frequency domain resource on which the random access preamble is located is used to indicate the quantity of sending times of the random access information, or another frequency domain resource on which the random access preamble is located is used to indicate the random access response window length.

12. The method according to claim 11, wherein the method further comprises:
sending, by the network device, indication information to the terminal device, wherein the indication information is used to indicate a mapping relationship between the quantity of sending times of the random access information and a frequency domain resource set, and the frequency domain resource set comprises the frequency domain resource on which the random access preamble is located; or
sending, by the network device, other indication information to the terminal device, wherein the other indication information is used to indicate a correspondence between the random access response window length and another frequency domain resource set, and the another frequency domain resource set comprises the frequency domain resource on which the random access preamble is located.

13. The method according to claim 8, wherein the method further comprises:
sending, by the network device, a first random access response window length to the terminal device, wherein the first random access response window length is different from another random access response window length in a preset spectrum.

14. The method according to claim 8, wherein the random access response window length increases, by the preset threshold, from the another random access response window length corresponding to the previously sent random access information.

15. A terminal device comprising:
a transceiver module, configured to send random access information to a network device, wherein the random access information is used to indicate a quantity of sending times of the random access information sent by the terminal device to the network device; or the random access information is used to indicate a random access response window length corresponding to the random access information, and the random access response window length is configurable; and
a processing module, configured to detect a random access response in a random access response window by using the transceiver module;
wherein the random access response window length differs, by a preset threshold, from another random access response window length corresponding to previously sent random access information; or
the random access response window length is m times the another random access response window length corresponding to the preciously sent random access information, wherein m is a number greater than 1.

16. The terminal device according to claim 15, wherein the random access information comprises a random access preamble; and the random access preamble is used to indicate the quantity of sending times of the random access information, or the random access preamble is used to indicate the random access response window length.

17. The terminal device according to claim 16, wherein
the transceiver module is further configured to obtain first indication information from the network device, wherein the first indication information is used to indicate a mapping relationship between the quantity of sending times of the random access information and a first random access preamble set, and the first random access preamble set comprises the random access preamble; or
the transceiver module is further configured to obtain second indication information from the network device, wherein the second indication information is used to indicate a correspondence between the random access response window length and a second random access preamble set, and the second random access preamble set comprises the random access preamble.

18. The terminal device according to claim 15, wherein the random access information comprises a random access preamble; and a frequency domain resource on which the random access preamble is located is used to indicate the quantity of sending times of the random access information, or another frequency domain resource on which the random access preamble is located is used to indicate the random access response window length.

19. The terminal device according to claim 18, wherein
the transceiver module is further configured to obtain indication information from the network device, wherein the indication information is used to indicate a mapping relationship between the quantity of sending times of the random access information and a frequency domain resource set, and the frequency domain resource set comprises the frequency domain resource on which the random access preamble is located; or
the transceiver module is further configured to obtain other indication information from the network device, wherein the other indication information is used to indicate a correspondence between the random access response window length and another frequency domain resource set, and the another frequency domain resource set comprises the frequency domain resource on which the random access preamble is located.

20. The terminal device according to claim 15, wherein the random access response window length increases, by the preset threshold, from the another random access response window length corresponding to the previously sent random access information.

* * * * *

UNITED STATES PATENT AND TRADEMARK OFFICE
CERTIFICATE OF CORRECTION

PATENT NO. : 11,930,525 B2
APPLICATION NO. : 17/206475
DATED : March 12, 2024
INVENTOR(S) : Lili Zhang It is certified that error appears in the above-identified patent and that said Letters Patent is hereby corrected as shown below:

In the Specification

At Column 15, Line 33, please correct the paragraph as follows:
When the backoff counter is reset to zero, the sending device may determine that the channel sensing succeeds (also referred to as a success of LBT sensing). In this scenario, the sending device may immediately occupy the channel to send control information and/or service data. In some embodiments, the sending device may alternatively wait for a period of time after the backoff counter is reset to zero. After the waiting ends, the sending device may use an additional slot (for example, 9 µs or 25 µs 9 x k µs, where k is zero or a positive integer) to sense the channel in another attempt. If the sending device senses the channel idle in the additional slot, the sending device may determine that the channel sensing succeeds. In this scenario, the sending device may immediately occupy the channel to send control information and/or service data.

At Column 15, Line 58, please correct the paragraph as follows:
A second type of channel sensing is short-duration channel sensing. To be specific, when the sending device performs the second type of channel sensing, a duration from starting of the channel sensing to the success of the channel sensing is relatively short. In some embodiments, the second type of channel sensing may also be referred to as type 2 channel access. Currently, common examples of the second type of channel sensing include single-slot CCA. In some embodiments, the single-slot CCA is also referred to as one-shot CCA or 25 µs CCA.

At Column 16, Line 1, please correct the paragraph as follows:
A single-slot CCA process performed by the sending device may be: the sending device performs single-slot sensing on the channel for a preset time length (for example, 25 µs). If the sending device senses the channel idle in the single slot, the sending device determines that the channel sensing succeeds. In this scenario, the sending device may immediately occupy the channel to send control information and/or service data. If the sending device senses the channel busy in the single slot, the sending device determines that the channel sensing fails. In this scenario, the sending device abandons sending the transmission on the channel. In specific implementation, the sending device may compare the power received on the channel in the single slot with the CCA-ED. If the power on the channel is Signed and Sealed this
Ninth Day of April, 2024

Katherine Kelly Vidal
*Director of the United States Patent and Trademark Office* greater than or equal to the CCA-ED, it is determined that the channel is busy; or, if the power on the channel is less than the CCA-ED, it is determined that the channel is idle.

At Column 16, Line 18, please correct the paragraph as follows:
Understandably, the second type of channel sensing may alternatively be other channel sensing that enables quick sensing on a channel. This is not limited herein. In addition, without being limited to 25 μs, a sensing duration of the second type of channel sensing may be a longer or shorter duration. Without being limited to 1, a count of sensing in the second type of channel sensing may be 2, 3, or more. This is not specifically limited herein.